(12) United States Patent
Harrison et al.

(10) Patent No.: US 8,198,225 B2
(45) Date of Patent: Jun. 12, 2012

(54) SULFURIZED METAL ALKYL PHENATE COMPOSITIONS HAVING A LOW ALKYL PHENOL CONTENT

(75) Inventors: James J. Harrison, Novato, CA (US); John McDonald, Emeryville, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 1025 days.

(21) Appl. No.: 11/946,878

(22) Filed: Nov. 29, 2007

(65) Prior Publication Data
US 2009/0143264 A1 Jun. 4, 2009

(51) Int. Cl.
*C10M 105/72* (2006.01)
*C10M 135/30* (2006.01)
*C10M 159/22* (2006.01)

(52) U.S. Cl. ............... 508/572; 508/568; 508/574

(58) Field of Classification Search .......... 508/572, 508/574, 568
See application file for complete search history.

(56) References Cited

U.S. PATENT DOCUMENTS

| | | | |
|---|---|---|---|
| 2,360,302 A | 10/1944 | Etzler et al. | |
| 2,472,517 A * | 6/1949 | Cantrell et al. | 508/572 |
| 2,744,083 A * | 5/1956 | Cyphers et al. | 508/276 |
| 3,044,961 A | 7/1962 | Morway et al. | |
| 3,178,368 A | 4/1965 | Hanneman et al. | |
| 3,493,516 A | 2/1970 | Allphin, Jr. et al. | |
| 3,528,917 A * | 9/1970 | Dadura et al. | 508/572 |
| 3,549,534 A * | 12/1970 | Krug et al. | 508/224 |
| 3,706,632 A * | 12/1972 | Day et al. | 508/574 |
| 3,801,507 A | 4/1974 | Hendrickson et al. | |
| 3,951,830 A | 4/1976 | Karn | |
| 4,021,419 A | 5/1977 | Karn | |
| 4,251,379 A | 2/1981 | Le Coent et al. | |
| 4,744,921 A | 5/1988 | Liston | |
| 4,957,642 A | 9/1990 | Cleverley et al. | |
| 5,118,875 A * | 6/1992 | Martella et al. | 568/727 |
| 5,529,705 A | 6/1996 | Small, Jr. et al. | |
| 5,677,270 A | 10/1997 | Small, Jr. et al. | |
| 6,030,930 A * | 2/2000 | Emert et al. | 508/312 |
| 6,310,009 B1 | 10/2001 | Kocsis et al. | |
| 2005/0277559 A1 | 12/2005 | Shaw et al. | |
| 2006/0046941 A1 | 3/2006 | Chambard et al. | |
| 2006/0111257 A1 | 5/2006 | Kadkhodayan et al. | |
| 2007/0049508 A1 | 3/2007 | Stonebraker et al. | |

OTHER PUBLICATIONS

Noriyoshi Kon et al., Facile synthesis of thiacalix[n]arenes (n=4, 6, and 8) consisting of p-tert-butylphenol and methylene/sulfide alternating linkage and metal-binding property of the n=4 homologue, Tetrahedron Letter, 2004, 45, pp. 207-211.

Yoshihiro Ohba et al., Synthesis and Inclusion Properties of Sulfur-Bridged Analogs of Acyclic Phenol-Formaldehyde Oligomers, Bull. Chem. Soc. Jpn., 1991, 64, pp. 576-582.

* cited by examiner

*Primary Examiner* — Walter D Griffin
*Assistant Examiner* — Vishal Vasisth
(74) *Attorney, Agent, or Firm* — Jones Day

(57) ABSTRACT

Provided herein are sulfurized metal alkyl phenate compositions having a low alkyl phenol content. The sulfurized metal alkyl phenate compositions can be prepared by reacting a phenol compound of Formula (I) disclosed herein with an aldehyde to form a phenolic resin of Formula (II) disclosed herein and then by reacting the phenolic resin simultaneously with a metal base and a first sulfurizing agent. The sulfurized metal alkyl phenate compositions and the overbased sulfurized metal alkyl phenate compositions disclosed herein may be used as detergents for formulating lubricating oil compositions. The lubricating oil compositions disclosed herein have a reduced amount of the free phenol compound and a salt thereof.

40 Claims, No Drawings

SULFURIZED METAL ALKYL PHENATE COMPOSITIONS HAVING A LOW ALKYL PHENOL CONTENT

FIELD OF THE INVENTION

Provided herein are sulfurized metal alkyl phenate compositions having a low alkyl phenol content and methods of making such sulfurized metal alkyl phenate compositions. The sulfurized metal alkyl phenate compositions disclosed herein may be used as detergents for formulating lubricating oil compositions.

BACKGROUND OF THE INVENTION

The lubricant additive industry generally uses alkyl phenols (e.g., tetrapropenyl phenol, TPP) to prepare detergents comprising sulfurized metal alkyl phenate. Sulfurized metal alkyl phenates have been used as additives in lubricating oils for marine, automotive, railroad and air-cooled engines for more than forty years. Generally, there may be some unreacted alkyl phenols such as tetrapropenyl phenol (TPP) present in the sulfurized metal alkyl phenate as well as in lubricating oils containing one or more of the sulfurized metal alkyl phenates.

A recent reproductive toxicity study in rats sponsored by the Petroleum Additives Panel of the American Chemistry Council shows that free or unreacted TPP may cause adverse effects on male and female reproductive organs. Further, it is believed that TPP may be corrosive or irritating to the skin.

Generally, a sulfurized metal alkyl phenate can be prepared by (1) neutralizing an alkyl phenol (e.g., TPP) with a base (e.g., calcium hydroxide) in the presence of a glycol promoter to form an metal alkyl phenate (e.g., alkyl calcium phenate); (2) sulfurizing the metal alkyl phenate with sulfur to crosslink the aromatic rings of the metal alkyl phenate to form a sulfurized metal alkyl phenate; and (3) overbasing the crosslinked sulfurized metal alkyl phenate with carbon dioxide to increase the total base number (TBN) of the product. However, some sulfurized metal alkyl phenates prepared by such methods may contain a high level of unreacted alkyl phenol (e.g., TPP).

To reduce any potential health risks to customers and to avoid potential regulatory issues, there is a need to reduce the amount of free alkyl phenol in the sulfurized metal alkyl phenates. Furthermore, there is a need for new lubricating oil detergents with a low free alkyl phenol content. Furthermore there is a need for new lubricating oil detergents having a low sulfur content.

SUMMARY OF THE INVENTION

Provided herein are methods of making sulfurized metal alkyl phenate compositions having a low alkyl phenol content. In one aspect, provided herein is a method of making a sulfurized metal alkyl phenate composition comprising the steps of:

(a) reacting a phenol compound of Formula (I):

wherein $R^1$ is alkyl, alkylaryl, or arylalkyl, in the presence of a catalyst with an aldehyde having formula $R^2$—CHO to form a phenolic resin of Formula (II):

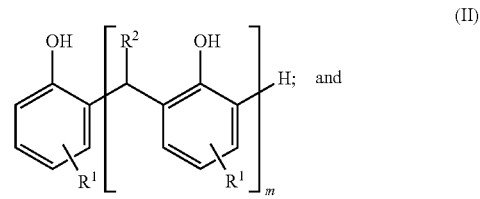

(b) reacting the phenolic resin wherein m is an integer from 1 to 50; $R^1$ is as defined above, and $R^2$ is H, alkyl, alkenyl, alkynyl, cycloalkyl, aryl, alkylaryl or arylalkyl simultaneously with at least one metal base and a first sulfurizing agent to form a sulfurized metal alkyl phenate.

In some embodiments, the method disclosed herein further comprises reacting the product of step b with carbon dioxide. In further embodiments, the reaction with carbon dioxide takes place in the presence of ethylene glycol.

In some embodiments, $R^1$ is alkyl. In certain embodiments, $R^1$ is alkyl of 8 to 100 carbon atoms or 8 to 50 carbon atoms or 10 to 30 carbon atoms. In further embodiments, $R^1$ is a $C_{12}H_{25}$ or dodecyl at the 4-position of the phenolic ring. In other embodiments, $R^2$ is H.

In certain embodiments, the at least one metal base is calcium hydroxide or calcium oxide. In some embodiments, the first sulfurizing agent is sulfur. In other embodiments, the catalyst is an acid.

In some embodiments, the sulfurized metal alkyl phenate composition disclosed herein comprises at least one of Formulae (III)-(VI):

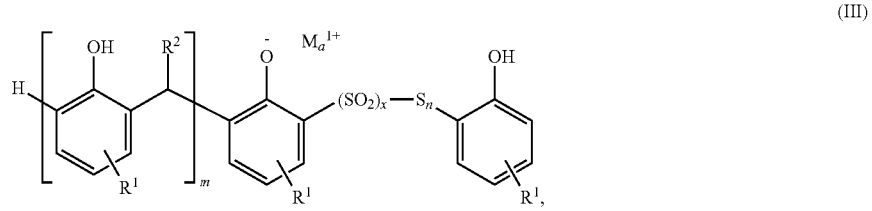

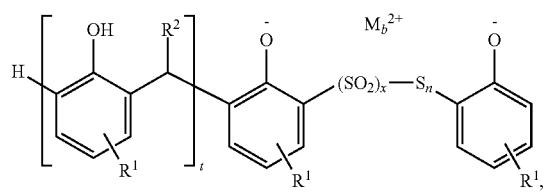

(IV)

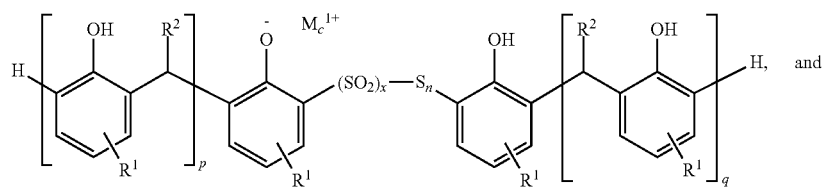

(V)

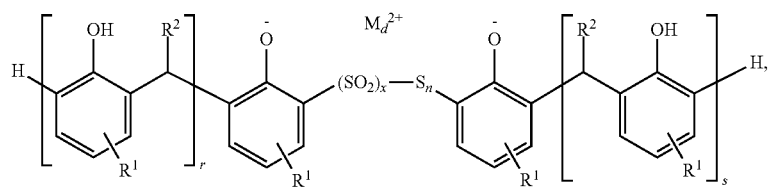

(VI)

wherein each of $M_a^{1+}$ and $M_c^{1+}$ is independently a monovalent metal ion; each of $M_b^{2+}$ and $M_d^{2+}$ is independently a divalent metal ion; each of m, n, p, q, r, s and t is independently an integer from 1 to 50; x is an integer from 0 to 2; $R^1$ is alkyl, alkylaryl, or arylalkyl; and $R^2$ is H, alkyl, alkenyl, alkynyl, cycloalkyl, aryl, alkylaryl or arylalkyl.

In certain embodiments, n is 1 to 10. In some embodiments n is from 1 to 3. In other embodiments n is 1. In further embodiments, the sulfurized metal alkyl phenate composition comprises at least one of Formulae (IV) and (VI) where each of $M_b^{2+}$ and $M_d^{2+}$ is independently an alkaline earth metal ion. In further embodiments, the alkaline earth metal ion is a calcium ion. In some embodiments, each of m, p, q, r, s, and t is independently from about 1 to about 10, from about 1 to about 5, or from about 1 to about 3. In other embodiments, x of Formula (III), (IV), (V) or (VI) is 0. In further embodiments, x of Formula (III), (IV), (V) or (VI) is 1. In still further embodiments, x of Formula (III), (IV), (V) or (VI) is 1 and n is 0.

In some embodiments, $R^1$ is a $C_{12}H_{25}$ alkyl group at the 4-position of the phenolic ring; and $R^2$ is H. In further embodiments, each of r, s and t is 1. In some embodiments, each of m, p and q is 1.

In certain embodiments, the sulfurized metal alkyl phenate composition comprises the unreacted phenol compound of Formula (I), a metal salt thereof or a combination thereof and wherein the total amount of the unreacted phenol compound and the metal salt thereof is less than about 5 wt. %, based on the total weight of the sulfurized metal alkyl phenate composition.

In some embodiments, the method disclosed herein further comprises reacting the sulfurized metal alkyl phenate composition with a second sulfurizing agent to lower the total amount of the unreacted phenol compound of Formula (I) and a metal salt thereof to less than about 2.0 wt. %, based on the total weight of the sulfurized metal alkyl phenate composition. In further embodiments, the second sulfurizing agent is sulfur.

In certain embodiments, the method disclosed herein further comprises an overbasing step of contacting the sulfurized metal alkyl phenate composition with carbon dioxide.

In another aspect, provided herein is a sulfurized metal alkyl phenate composition or an overbased sulfurized metal alkyl phenate composition prepared by the methods disclosed herein.

In another aspect, provided herein is a lubricating oil composition comprising a base oil and a sulfurized metal alkyl phenate composition disclosed herein. In some embodiments, the lubricating oil composition further comprises at least an additive selected from the group consisting of antioxidants, antiwear agents, detergents, rust inhibitors, demulsifiers, friction modifiers, multi-functional additives, viscosity index improvers, pour point depressants, foam inhibitors, metal deactivators, dispersants, corrosion inhibitors, lubricity improvers, thermal stability improvers, anti-haze additives, icing inhibitors, dyes, markers, static dissipaters, biocides and combinations thereof. In further embodiments, the base oil is present in a major amount.

In another aspect, provided herein is a lubricating oil composition comprising a base oil and an overbased sulfurized metal alkyl phenate composition disclosed herein. In some embodiments, the lubricating oil composition further comprises at least an additive selected from the group consisting of antioxidants, antiwear agents, detergents, rust inhibitors, demulsifiers, friction modifiers, multi-functional additives, viscosity index improvers, pour point depressants, foam inhibitors, metal deactivators, dispersants, corrosion inhibitors, lubricity improvers, thermal stability improvers, anti-haze additives, icing inhibitors, dyes, markers, static dissipaters, biocides and combinations thereof.

DEFINITIONS

To facilitate the understanding of the subject matter disclosed herein, a number of terms, abbreviations or other shorthand as used herein are defined below. Any term, abbreviation or shorthand not defined is understood to have the ordinary meaning used by a skilled artisan contemporaneous with the submission of this application.

"A major amount" of a base oil refers to the amount of the base oil is at least 40 wt. % of the lubricating oil composition. In some embodiments, "a major amount" of a base oil refers to an amount of the base oil more than 50 wt. %, more than 60 wt. %, more than 70 wt. %, more than 80 wt. %, or more than 90 wt. % of the lubricating oil composition.

"Sulfated ash content" refers to the amount of metal-containing additives (e.g., calcium, magnesium, molybdenum, zinc, etc.) in a lubricating oil and is typically measured according to ASTM D874, which is incorporated herein by reference.

"Aldehyde" refers to an organic compound having at least one —CHO group. Non-limiting examples of aldehyde have the formula R—CHO where R is H, hydrocarbyl (e.g., alkyl, arylalkyl, cycloalkyl, aryl, alkenyl, alkynyl or alkylaryl), heteroalkyl, heterocycloalkyl or heteroaryl. Other non-limiting examples of aldehyde are dialdehydes having the formula OHC—R'—CHO where R' is a bond, alkylene or arylene.

"Substituted" as used to describe a compound or chemical moiety refers to that at least one hydrogen atom of that compound or chemical moiety is replaced with a second chemical moiety. The second chemical moiety can be any desired substituent that does not adversely affect the desired activity of the compound. Examples of substituents are those found in the exemplary compounds and embodiments disclosed herein, as well as halogen; alkyl; heteroalkyl; alkenyl; alkynyl; aryl, heteroaryl, hydroxyl; alkoxyl; amino; nitro; thiol; thioether; imine; cyano; amido; phosphonato; phosphine; carboxyl; thiocarbonyl; sulfonyl; sulfonamide; ketone; aldehyde; ester; oxo; haloalkyl (e.g., trifluoromethyl); carbocyclic cycloalkyl, which can be monocyclic or fused or non-fused polycyclic (e.g., cyclopropyl, cyclobutyl, cyclopentyl or cyclohexyl) or a heterocycloalkyl, which can be monocyclic or fused or non-fused polycyclic (e.g., pyrrolidinyl, piperidinyl, piperazinyl, morpholinyl or thiazinyl); carbocyclic or heterocyclic, monocyclic or fused or non-fused polycyclic aryl (e.g., phenyl, naphthyl, pyrrolyl, indolyl, furanyl, thiophenyl, imidazolyl, oxazolyl, isoxazolyl, thiazolyl, triazolyl, tetrazolyl, pyrazolyl, pyridinyl, quinolinyl, isoquinolinyl, acridinyl, pyrazinyl, pyridazinyl, pyrimidinyl, benzimidazolyl, benzothiophenyl or benzofuranyl); amino (primary, secondary or tertiary); o-lower alkyl; o-aryl, aryl; aryl-lower alkyl; —$CO_2CH_3$; —$CONH_2$; —$OCH_2CONH_2$; —$NH_2$; —$SO_2NH_2$; —$OCHF_2$; —$CF_3$; —$OCF_3$; —NH(alkyl); —N(alkyl)$_2$; —NH(aryl); —N(alkyl)(aryl); —N(aryl)$_2$; —CHO; —CO(alkyl); —CO(aryl); —$CO_2$(alkyl); and —$CO_2$(aryl); and such moieties can also be optionally substituted by a fused-ring structure or bridge, for example —$OCH_2O$—. These substituents can optionally be further substituted with a substituent selected from such groups. All chemical groups disclosed herein can be substituted, unless it is specified otherwise.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

DESCRIPTION OF EMBODIMENTS OF THE INVENTION

Embodiments of this invention provide methods of making sulfurized metal alkyl phenate compositions having a low alkyl phenol content. In one aspect, provided herein is a method of making a sulfurized metal alkyl phenate composition comprises the steps of:

(a) reacting a phenol compound of Formula (I):

wherein $R^1$ is alkyl, alkylaryl, or arylalkyl, in the presence of a catalyst with an aldehyde having formula $R^2$—CHO to form a phenolic resin of Formula (II):

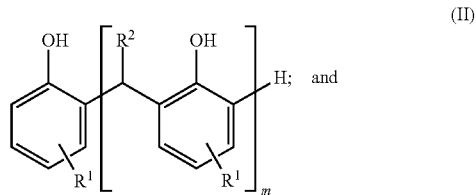

(b) reacting the phenolic resin wherein m is an integer from 1 to 50; $R^1$ is as defined above, and $R^2$ is H, alkyl, alkenyl, alkynyl, cycloalkyl, aryl, alkylaryl or arylalkyl simultaneously with at least one metal base and a first sulfurizing agent to form a sulfurized metal alkyl phenate, In some embodiments, $R^1$ is alkyl. In certain embodiments, $R^1$ is alkyl of 8 to 100 carbon atoms or 8 to 50 carbon atoms or 10 to 30 carbon atoms. In further embodiments, $R^1$ is a $C_{12}H_{25}$ or dodecyl at the 4-position of the phenolic ring. In other embodiments, $R^2$ is H.

In some embodiments, the mole ratio of the aldehyde, $R^2$—CHO, to the phenol compound of Formula (I) is from about 1:1 to about 0.1:1, from less than 0.9:1 to about 0.1:1, from 0.89:1 to about 0.1:1, from about 0.85:1 to about 0.1:1, from about 0.7:1 to about 0.1:1, from about 0.7:1 to about 0.2:1, from about 0.1:1 to about 2:1, from about 0.2:1 to about 0.4:1, or from about 0.5:1 to about 0.2:1.

Please note that the mole ratio of the aldehyde, $R^2$—CHO, to the phenol compound of Formula (I) is defined with respect to the equivalent moles of formaldehyde and phenol, respectively. One skilled in the art will recognize that one mole of trioxane is equivalent to 3 moles of formaldehyde. Therefore, if a trioxane is used, the mole ratio of aldehyde to phenolic disclosed herein should be reduced by a factor of 3.

In some embodiments, the phenolic resin of Formula (II) can be made by heating the phenol compound of Formula (I) with a deficiency of the aldehyde, $R^2$—CHO, (i.e, the mole ratio of the aldehyde to the phenol compound of Formula (I) is less than 1), often in the presence of an acid catalyst. Phenolic resins obtained under such conditions generally do not condense further by themselves unless a reactive material, such as additional aldehydes and/or formaldehyde donors (e.g., hexamethylenetetramine), are added. Alternatively, the phenolic resin of Formula (II) can be prepared by reacting the phenol compound with a deficiency of the aldehyde in the presence of a basic catalyst.

Generally, the phenolic resins disclosed herein are not cross-linked. Therefore, it is desirable that the mole ratio of the aldehyde to the phenol compound be less than about 1 to prevent cross-linking and/or gelation during preparation. In some embodiments, the mole ratio of the aldehyde to the phenol compound is less than 1:1, less than 0.9:1, less than 0.85:1, less than 0.8:1, less than 0.75:1, less than 0.7:1, less than 0.65:1, less than 0.6:1, less than 0.65:1, less than 0.6:1, less than 0.55:1, less than 0.5:1, less than 0.45:1, less than 0.4:1, less than 0.35:1, less than 0.3:1, less than 0.25:1, or less than 0.2:1.

In some embodiments, the phenolic resins disclosed herein have a number average molecular weight ($M_n$) in the range of from about 125 to about 5000 daltons. In some embodiments, the phenolic resins disclosed herein display a glass transition temperature in the range of from about 45° C. to about 100° C. In further embodiments, the $M_n$ is between about 125 and about 800 daltons or between about 800 and about 1500 daltons.

An embodiment of the phenolic resins disclosed herein is illustrated in Scheme A below wherein m is an integer from 1 to 50; $R^1$ is alkyl, alkylaryl, or arylalkyl; and $R^2$ is H, alkyl, alkenyl, alkynyl, cycloalkyl, aryl, alkylaryl or arylalkyl.

SCHEME A

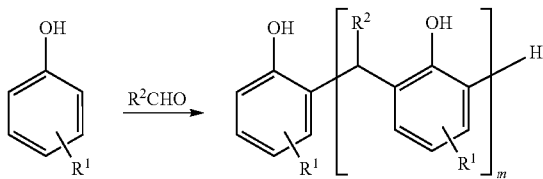

In some embodiments, the aldehyde, $R^2$—CHO, is formaldehyde, i.e., $R^2$ is H, or a source of formaldehyde, such as trioxane and paraformaldehyde. In some embodiments, the phenol compound of Formula (I) is tetrapropenyl phenol, i.e., $R^1$ is $C_{12}H_{25}$. In certain embodiments, the tetrapropenyl phenol comprises a mixture of the isomers of TPP, such as a mixture of p-dodecylphenol, m-dodecylphenol and o-dodecylphenol. In further embodiments, the aldehyde is HCHO or a source of HCHO and the phenol compound is tetrapropenyl phenol. One embodiment of the phenolic resins disclosed herein is illustrated in Scheme B below wherein m is an integer from 1 to 50.

SCHEME B

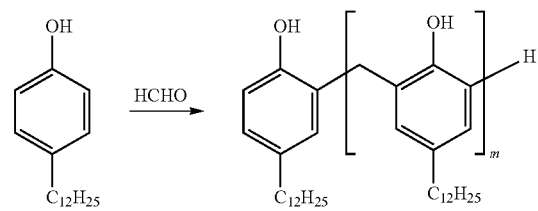

In some embodiments, the catalyst is an acid catalyst. The acid catalyst can be an inorganic acid, an organic acid or a combination thereof. Non-limiting examples of suitable inorganic acids include sulfuric acid, hydrochloric acid, nitric acid, phosphoric acid, and combinations thereof. All of the above-mentioned acids can be obtained commercially from a supplier such as Aldrich Chemicals.

Some non-limiting examples of suitable organic acids include formic acid, acetic acid, propanoic acid, butanoic acid, pentanoic acid, hexanoic acid, oxalic acid, malonic acid, succinic acid, glutaric acid, adipic acid, benzoic acid, phthalic acid, 4-nitrobenzoic acid, p-toluenesulfonic acid (PTSA), 4-(trifluoromethyl)benzoic acid, benzenesulfonic acid, benzene-1,2-disulfonic acid, benzene-1,3-disulfonic acid, benzene-1,4-disulfonic acid, xylenesulfonic acid, 2,4,6-trimethylbenzenesulfonic acid, methanesulfonic acid, 4-chlorobenzenesulfonic acid and combinations thereof. In some embodiments, the acid catalyst is selected from the group consisting of benzenesulfonic acid, alkylbenzene sulfonic acid, benzene-1,2-disulfonic acid, benzene-1,3-disulfonic acid, benzene-1,4-disulfonic acid, $C_{20}$-$C_{40}$ alkylbenzene sulfonic acid and toluenesulfonic acid (e.g., p-toluenesulfonic acid), xylenesulfonic acid, 2,4,6-trimethylbenzenesulfonic acid, methanesulfonic acid, 4-chlorobenzenesulfonic acid and combinations thereof. In other embodiments, the acid catalyst is one or more of alkylbenzene sulfonic acids. In further embodiments, the acid catalyst is $C_{20}$-$C_{40}$ alkylbenzene sulfonic acid.

In some embodiments, the acid catalyst is sufficiently acidic to catalyze the reaction of the phenol compound with the aldehyde. In some embodiments, the amount of suitable organic acid used is from about 0.01 mole percent to about 1 mole percent, from about 0.01 mole percent to about 0.5 mole percent, from about 0.02 mole percent to about 0.1 mole percent, or from about 0.03 mole percent to about 0.05 mole percent, based on the total amount of the phenol compound.

In some embodiments, the phenolic resins disclosed herein are not substantially cross-linked after the reaction. The term "not substantially cross-linked" means that the degree of cross-linking is less than 10%, preferably less than about 5%, more preferably less than about 3% or further preferably less than about 1%. The degree of cross-linking of a resin refers to the weight percentage of the gel (i.e., the insoluble portion in a chosen solvent) in the resin.

In some embodiments, the phenol compounds for the preparation of the phenolic resins disclosed herein include, but are not limited to, mononuclear phenol compounds with an aromatic nucleus to which at least one hydroxyl group is attached. Some non-limiting examples of suitable mononuclear compounds include derivatives of phenol such as o-cresol, m-cresol, p-cresol, o-phenylphenol, p-phenylphenol, 3,5-xylenol, 3,4-xylenol, 3-ethylphenol, 3,5-diethylphenol, p-butylphenol, 3,5-dibutylphenol, p-amylphenol, p-cyclohexylphenol, p-octylphenol, p-nonylphenol, decylphenol, tetrapropenyl phenol (TPP), styrylphenol, 3,5-dicyclohexylphenol, p-crotylphenol and combinations thereof. In some embodiments, the derivatives of phenol include $C_8$-$C_{100}$, $C_8$-$C_{50}$, $C_{10}$-$C_{30}$, or $C_{12}$ alkyl phenol compounds such as tetrapropenyl phenol (TPP). In some embodiments, the tetrapropenyl phenol (TPP) is manufactured by alkylation of phenol with a $C_{12}$ branched chain propylene tetramer. In other embodiments, suitable mononuclear phenol compounds include a mixture of branched and linear alkyl phenol compounds.

In certain embodiments, at least two phenol compounds are used for the preparation of the phenolic resins disclosed herein. For example, the first phenol compound can be a substituted phenol; the second phenol compound can be a different substituted phenol. In other instances, each of the first and second phenol compounds is TPP or substituted phenol, provided that the two phenol compounds are different. Non-limiting examples of such combination include TPP/cresol, TPP/p-butylphenol, TPP/p-octyl phenol, TPP/$C_{20-28}$ alkyl phenol and the like. In one embodiment the $C_{20-28}$ alkyl phenol is derived from the reaction of phenol with a mixture of $C_{20-24}$ and $C_{26-28}$ alpha olefins.

In some embodiments, the reaction between TPP and formaldehyde occurs under atmospheric conditions, under vacuum, or at elevated pressures. In some embodiments, the reaction between TPP and formaldehyde occurs in the presence of an organic acid, such as p-toluenesulfonic acid (PTSA), wherein the mole ratio of formaldehyde to TPP is between about 1:1 and about 0.1:1, between less than 0.9:1 and about 0.1:1, between 0.89:1 and about 0.1:1, between about 0.85:1 and about 0.1:1, between about 0.7:1 and about 0.1:1, between about 0.7:1 and about 0.2:1, between about 0.1:1 and about 2:1, between about 0.2:1 and about 0.4:1, or between about 0.5:1 and about 0.2:1. In further embodiments, such phenolic resin contains less than 5 wt. % of free or unreacted TPP, based on the total weight of the phenolic resin.

In some embodiments, suitable aldehydes for the preparation of the phenolic resins include any aldehyde that can react with a phenol compound. In some embodiments, $R^2$ of the aldehyde, $R^2$—CHO, is H, alkyl having 1-20 carbon atoms, aryl having 6-20 carbon atoms, arylalkyl having 7-20 carbon atoms, alkylaryl having 7 to 20 carbon atoms, heteroaryl, alkenyl or aralkenyl. In further embodiments, $R^2$ of the aldehyde, $R^2$—CHO, is H, alkyl, alkenyl, alkynyl, cycloalkyl, aryl, alkylaryl or arylalkyl. In still further embodiments, $R^2$ is methyl, ethyl, propyl, isopropyl, butyl, isobutyl, pentyl, isopentyl, hexyl, octyl, nonyl, decyl, benzyl, and the like. Some non-limiting examples of suitable aldehydes for this invention include formaldehyde, acetaldehyde, propionaldehyde, butyraldehyde, iso-butyraldehyde, n-valeraldehyde, benzaldehyde, crotonaldehyde, cinnamaldehyde, glyoxal, glutaraldehyde, furfural, phenylacetaldehyde, chloral, chloroacetaldehyde, dichloroacetaldehyde, laurylaldehyde, palmitylaldehyde, stearylaldehyde and mixtures thereof.

Unless it is otherwise stated, formaldehyde for this invention includes not only formaldehyde solutions or gas, but also any source of formaldehyde, such as paraformaldehyde, trioxane and tetraoxane, that can generate formaldehyde (HCHO) at room temperature or upon heating.

While aldehyde is preferred, any ketone that can react with a phenol compound can then be used. Non-limiting examples of suitable ketones include acetone and methyl ethyl ketone.

In some embodiments, at least two different aldehydes are used simultaneously or sequentially. The first and second aldehyde can be any of the above aldehyde compounds, so long as they are different. Preferably, the first aldehyde is formaldehyde. The second aldehyde can be an aldehyde with at least 2 carbon atoms per molecule.

To prepare the phenolic resin, the phenol compound can react with at least an aldehyde such as formaldehyde. The condensation reaction of the phenol compound with the aldehyde may be carried out with or without a catalyst. In some embodiments, the reaction occurs in the presence of a conventional acid catalyst. Examples of suitable acid catalysts are set forth above. In other embodiments, the phenol compound-aldehyde reaction is carried out at a temperature from about 50° C. to about 200° C., from about 65° C. to about 210° C., from about 85° C. to 175° C., or from about 90° C. to about 130° C. In some embodiments, the phenol compound-aldehyde reaction is carried out under vacuum, at atmospheric pressure or at elevated pressures. In some embodiments, the phenol compound-aldehyde reaction is carried out in a batch reactor or continuous reactor.

In some embodiments, the reaction time of the phenol compound-aldehyde reaction ranges from about 10 minutes to about 12 hours, from about 15 minutes to about 5 hours, or from about 30 minutes to about 1 hour.

The use of a solvent for the condensation reaction is optional. Any solvent that can dissolve the phenolic resin can be used herein. Some non-limiting examples of suitable solvents include toluene, xylene, cyclohexane, a base oil disclosed herein, an alcohol, a ketone, an ether, an ether alcohol, and the like. In some embodiments, the reaction occurs without a solvent. In other embodiments, a solvent can be used when the viscosity of the reaction mixture is excessively increased during the reaction.

In other embodiments, TPP and formaldehyde are reacted at a mole ratio of 1 mole of TPP to 0.2 to 0.5 moles of the total aldehyde at about 50° C. to about 100° C. The TPP-formaldehyde reaction product is then dehydrated at atmospheric pressure at about 100° C. to about 140° C.

In some embodiments, the phenolic resin formed as described above is distilled to remove the unreacted phenol compounds before further reactions.

The sulfurized metal alkyl phenate compositions can be prepared by reacting the phenolic resin simultaneously with at least one metal base and a first sulfurizing agent. In some embodiments, the reaction mixture is heated with ethylene glycol to form the sulfurized oligomeric calcium phenate. In other embodiments, the sulfurized metal alkyl phenate compositions comprise at least one of Formulae (III)-(VI):

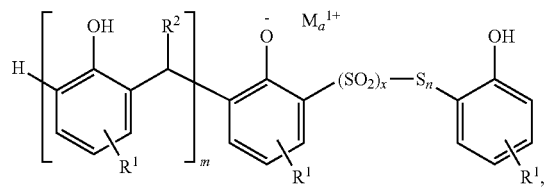

(III)

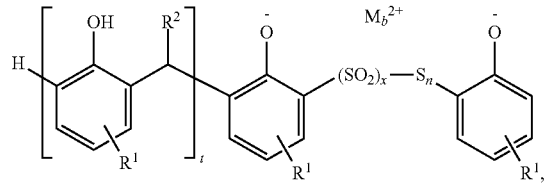

(IV)

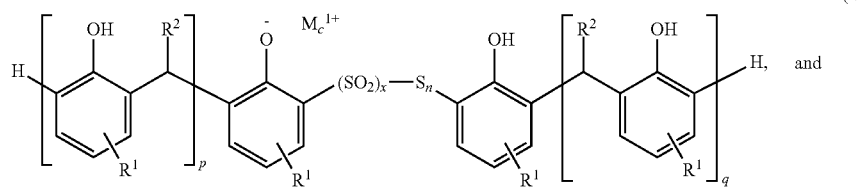
(V)

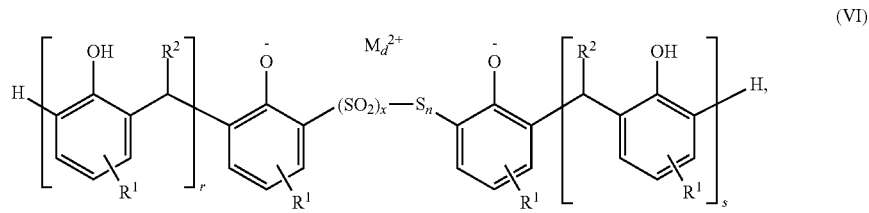
(VI)

wherein each of $M_a^{1+}$ and $M_c^{1+}$ is independently a monovalent metal ion; each of $M_b^{2+}$ and $M_d^{2+}$ is independently a divalent metal ion; each of m, n, p, q, r, s and t is independently an integer from 1 to 50; x is an integer from 0 to 2; $R^1$ is alkyl, alkylaryl, or arylalkyl; and $R^2$ is H, alkyl, alkenyl, alkynyl, cycloalkyl, aryl, alkylaryl or arylalkyl.

In some embodiments, the sulfurized metal alkyl phenate compositions further comprises at least one of Formulae (VII)-(VIII):

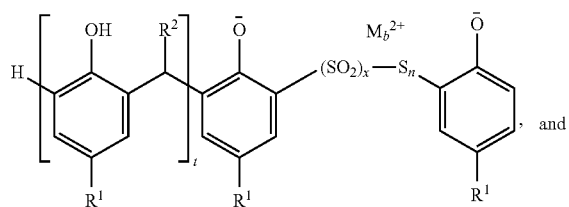
(VII)

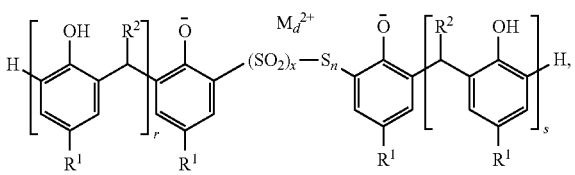
(VIII)

wherein $M_b^{2+}$, $M_d^{2+}$, n, r, s, t, x, $R^1$ and $R^2$ are as defined above.

In some embodiments, the sulfurized metal alkyl phenate compositions further comprise at least one of Formulae (IX)-(X):

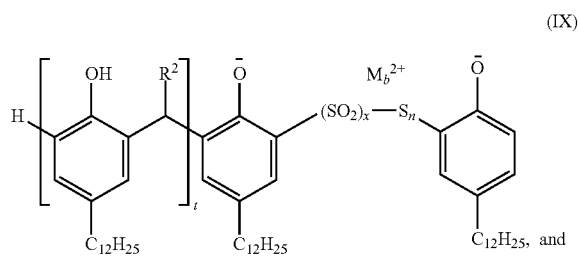
(IX)

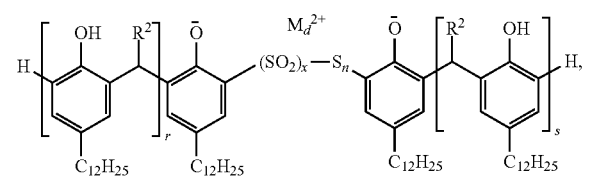
(X)

wherein $M_b^{2+}$, $M_d^{2+}$, n, r, s, t, x, and $R^2$ are as defined above.

In some embodiments, the sulfurized metal alkyl phenate compositions further comprise at least one of Formulae (XI)-(XII):

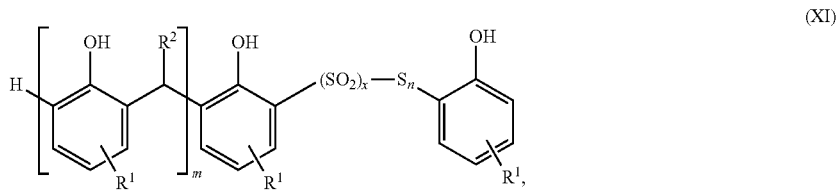
(XI)

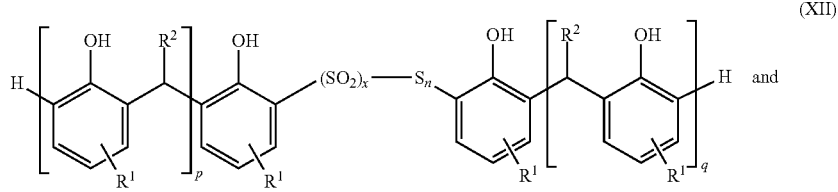

wherein m, n, p, q, x, $R^1$ and $R^2$ are as defined above.

In some embodiments, $R^1$ of any of Formula (I)-(VIII) is an alkyl group. In other embodiments, $R^1$ is a $C_{12}H_{25}$ alkyl group. In other embodiments, $R^1$ is a $C_{12}H_{25}$ alkyl group at the 4-position of the phenolic ring. In certain embodiments, $R^2$ of any of Formula (I)-(XII) is H. In further embodiments, $R^1$ is a $C_{12}H_{25}$ alkyl group at the 4-position of the phenolic ring and $R^2$ of any of Formula (I)-(XII) is H. In still further embodiments, $R^1$ is a $C_{12}H_{25}$ alkyl group at the 4-position of the phenolic ring; $R^2$ is H; and each of m, n, p, q, r, s and t is 1. In certain embodiments, x of any of Formula (I)-(XII) is 0. In other embodiments, x of any of Formula (I)-(XII) is 1. In further embodiments, x of any of Formula (I)-(XII) is 1 and n is 0.

In some embodiments, the metal base is or comprises an alkali metal base, alkaline earth metal base or a combination thereof. Some non-limiting examples of suitable alkali metal bases include lithium hydroxide, sodium hydroxide, potassium hydroxide, rubidium hydroxide, cesium hydroxide, lithium oxide, sodium oxide, potassium oxide, rubidium oxide, cesium oxide, lithium hydride, sodium hydride, potassium hydride, rubidium hydride, cesium hydride, lithium carbonate, sodium carbonate, potassium carbonate, rubidium carbonate, cesium carbonate, lithium bicarbonate, sodium bicarbonate, potassium bicarbonate, rubidium bicarbonate, cesium bicarbonate and combinations thereof. Some non-limiting examples of suitable alkaline earth metal bases include beryllium hydroxide, magnesium hydroxide, calcium hydroxide, strontium hydroxide, barium hydroxide, beryllium oxide, magnesium oxide, calcium oxide, strontium oxide, barium oxide, beryllium hydride, magnesium hydride, calcium hydride, strontium hydride, barium hydride, beryllium carbonate, magnesium carbonate, calcium carbonate, strontium carbonate, barium carbonate, beryllium bicarbonate, magnesium bicarbonate, calcium bicarbonate, strontium bicarbonate, barium bicarbonate, and combinations thereof. Other non-limiting examples of suitable bases includes hydrides, oxides, hydroxides, carbonates, bicarbonates of aluminum and transition metals. In other embodiments, the metal base is or comprises a carboxylate of an alkali metal, an alkaline metal, aluminum or a transition metal. In other embodiments, the metal base is or comprises a hydride, oxide, hydroxide, carbonate, bicarbonate, carboxylate of an alkaline metal, such as Be, Mg, Ca, Sr, Ba or Ra, or a transition metal such as Zn, Cu, Fe, Ni, Co, Cr, Mn, Ti, V, Sc, Ru, Pt, Pd, Au, Ag, Zr, Ru. Rh, Cd or W. In other embodiments, the metal base is or comprises calcium hydroxide or calcium oxide.

The amount of the metal base added to the reaction mixture varies according to the amount of metal phenate group desired in the sulfurized metal alkyl phenate composition. In some embodiments, the mole ratio of the phenol compound to the metal base is from about 0.1 to about 4.0, from about 0.25 to about 3.5, or from about 0.5 to about 3.0. In certain embodiments, a stoichiometric excess amount of the phenol compound is used. In other embodiments, a stoichiometric excess amount of the metal base is used. In some embodiments, where the phenol compound is a monophenol compound and the metal base is an alkali base, the mole ratio of the phenol compound to the metal base is from about 0.5 to about 1.5, from about 0.75 to about 1.5, or from about 0.9 to about 1.1. In other embodiments, where the phenol compound is a biphenol compound and the metal base is an alkaline base, the mole ratio of the phenol compound to the metal base is from about 0.5 to about 1.5, from about 0.75 to about 1.5, or from about 0.9 to about 1.1. In further embodiments, where the phenol compound is a monophenol compound and the metal base is an alkaline base, the mole ratio of the phenol compound to the metal base is from about 1 to about 3, from about 1.5 to about 2.5, or from about 1.75 to about 2.25.

In certain embodiments, the sulfurized metal alkyl phenate composition comprises at least one of Formulae (IV) and (VI) where each of $M_b^{2+}$ and $M_d^{2+}$ is independently an ion of alkaline metal such as Be, Mg, Ca, Sr, Ba or Ra. In further embodiments, the alkaline metal is calcium.

In some embodiments, the sulfurizing agent is or comprises elemental sulfur, a sulfur halide (e.g., sulfur monochloride or sulfur dichloride) or a combination thereof. If a sulfur halide is used as the sulfurizing agent, an extra amount of the metal base or a second base may be used to neutralize the hydrogen halide evolved. In other embodiments, a solvent, such as those solvents disclosed hereinabove, can be used to effect substantial reaction.

In some embodiments, the sulfurization reaction occurs in the presence of a base disclosed herein. In other embodiments, the sulfurization reaction may be effected by heating a mixture of the phenol resin, the metal base and the sulfurizing agent at a temperature from about 50° C. to about 250° C., from about 75° C. to about 225° C. or from about 100° C. to about 200° C. In certain embodiments, the sulfurizing agent is sulfur and the reaction temperature is at least about 100° C., at least about 120° C., at least about 140° C., at least about 160° C., at least about 180° C. or at least about 200° C. In certain embodiments, n is 0. In other embodiments, n is 1. In further embodiments, n is 2.

In some embodiments, the mole ratio of the phenol compound to the sulfurizing agent is from about 0.5 to about 2.5. If the phenol compound is a monophenol compound, the equivalent weight of a sulfur halide is considered to be half its molecular weight, since one mole thereof reacts with two moles of phenol or the like. Conversely, if the phenol compound is a biphenol compound, such as a methylenediphenol or bisphenol A, is used, the mole ratio of sulfur to the phenol compound disclosed herein should be increased by a factor of 2 because one skilled in the art will recognize that one mole of the biphenol compound is equivalent to 2 moles of phenol.

In certain embodiments, at least one promoter is used to facilitate the sulfurization reaction. Some non-limiting examples of suitable promoters include alcohols such as $C_1$-$C_{12}$ alcohols and isodecanol, phenols, amines, carboxylic acids and salts and anhydrides thereof, aliphatic nitro compounds, water and the like. Others are described in numerous patents and will be readily apparent to those skilled in the art.

In certain embodiments, the sulfurized metal alkyl phenate composition comprises the unreacted phenol compound of Formula (I), a metal salt thereof or a combination thereof wherein the total amount of the unreacted phenol compound and the metal salt thereof is less than about 10 wt. %, less than about 7.5 wt. %, less than about 5 wt. %, less than about 4 wt. %, less than about 3 wt. %, or less than about 2 wt. %, based on the total weight of the sulfurized metal alkyl phenate composition.

In some embodiments, the method disclosed herein further comprises reacting the sulfurized metal alkyl phenate composition with a second sulfurizing agent to lower the total amount of the unreacted phenol compound of Formula (I) and a metal salt thereof to less than about 2.0 wt. %, based on the total weight of the sulfurized metal alkyl phenate composition. In further embodiments, the second sulfurizing agent is sulfur.

In certain embodiments, the method disclosed herein further comprises an overbasing step of contacting the sulfurized metal alkyl phenate composition with carbon dioxide. This overbasing or carbonation may be effected merely by passing carbon dioxide into the mixture at a temperature from about 25° C. to about 200° C., from about 50° C. to about 175° C. or from about 75° C. to about 150° C. Alternatively, the sulfurized metal alkyl phenate composition may be reacted with carbon dioxide in the presence of excess metal base and one or more promoters.

After the reaction is complete (with or without further sulfurization and/or carbonation), the volatile chemicals in the sulfurized metal alkyl phenate composition can be removed from the reaction mixture as described above. The removal of the volatile chemicals can be effected by any conventional removal technique such as extraction or distillation with or without a vacuum.

The sulfurized metal alkyl phenate composition can be used to formulate or prepare a lubricating oil composition. In some embodiments, the lubricating oil composition comprises at least one oil of lubricating viscosity and a sulfurized metal alkyl phenate composition disclosed herein. In other embodiments, the lubricating oil composition further comprises a additive known to be useful to modify or improve the properties of lubricating oils.

A. The Oil of Lubricating Viscosity

The lubricating oil compositions disclosed herein generally comprise at least one oil of lubricating viscosity. Any base oil known to a skilled artisan can be used as the oil of lubricating viscosity disclosed herein. Some base oils suitable for preparing the lubricating oil compositions have been described in Mortier et al., "*Chemistry and Technology of Lubricants,*" 2nd Edition, London, Springer, Chapters 1 and 2 (1996); and A. Sequeria, Jr., "*Lubricant Base Oil and Wax Processing,*" New York, Marcel Decker, Chapter 6, (1994); and D. V. Brock, *Lubrication Engineering*, Vol. 43, pages 184-5, (1987), all of which are incorporated herein by reference. Generally, the amount of the base oil in the lubricating oil composition may be from about 70 to about 99.5 wt. %, based on the total weight of the lubricating oil composition. In some embodiments, the amount of the base oil in the lubricating oil composition is from about 75 to about 99 wt. %, from about 80 to about 98.5 wt. %, or from about 80 to about 98 wt. %, based on the total weight of the lubricating oil composition.

In certain embodiments, the base oil is or comprises any natural or synthetic lubricating base oil fraction. Some non-limiting examples of synthetic oils include oils, such as polyalphaolefins or PAOs, prepared from the polymerization of at least one alpha-olefin, such as ethylene, or from hydrocarbon synthesis procedures using carbon monoxide and hydrogen gases, such as the Fisher-Tropsch process. In certain embodiments, the base oil comprises less than about 10 wt. % of one or more heavy fractions, based on the total weight of the base oil. A heavy fraction refers to a lube oil fraction having a viscosity of at least about 20 cSt at 100° C. In certain embodiments, the heavy fraction has a viscosity of at least about 25 cSt or at least about 30 cSt at 100° C. In further embodiments, the amount of the one or more heavy fractions in the base oil is less than about 10 wt. %, less than about 5 wt. %, less than about 2.5 wt. %, less than about 1 wt. %, or less than about 0.1 wt. %, based on the total weight of the base oil. In still further embodiments, the base oil comprises no heavy fraction.

In certain embodiments, the lubricating oil compositions comprise a major amount of a base oil of lubricating viscosity. In some embodiments, the base oil has a kinematic viscosity at 100° C. from about 2.5 centistokes (cSt) to about 20 cSt, from about 5 centistokes (cSt) to about 20 cSt, from about 7 cSt to about 16 cSt, or from about 9 cSt to about 15 cSt. The kinematic viscosity of the base oils or the lubricating oil compositions disclosed herein can be measured according to ASTM D 445, which is incorporated herein by reference.

In other embodiments, the base oil is or comprises a base stock or blend of base stocks. In further embodiments, the base stocks are manufactured using a variety of different processes including, but not limited to, distillation, solvent refining, hydrogen processing, oligomerization, esterification, and rerefining. In some embodiments, the base stocks comprise a rerefined stock. In further embodiments, the rerefined stock shall be substantially free from materials introduced through manufacturing, contamination, or previous use.

In some embodiments, the base oil comprises one or more of the base stocks in one or more of Groups I-V as specified in the American Petroleum Institute (API) Publication 1509, Fourteen Edition, December 1996 (i.e., API Base Oil Interchangeability Guidelines for Passenger Car Motor Oils and Diesel Engine Oils), which is incorporated herein by reference. The API guideline defines a base stock as a lubricant component that may be manufactured using a variety of different processes. Groups I, II and III base stocks are mineral oils, each with specific ranges of the amount of saturates, sulfur content and viscosity index. Group IV base stocks are polyalphaolefins (PAO). Group V base stocks include all other base stocks not included in Group I, II, III, or IV.

The saturates levels, sulfur levels and viscosity indices for Group I, II and III base stocks are listed in Table 1 below.

TABLE 1

| Group | Saturates (As determined by ASTM D 2007) | Sulfur (As determined by ASTM D 2270) | Viscosity Index (As determined by ASTM D 4294, ASTM D 4297 or ASTM D 3120) |
|---|---|---|---|
| I | Less than 90% saturates. | Greater than or equal to 0.03% sulfur. | Greater than or equal to 80 and less than 120. |
| II | Greater than or equal to 90% saturates. | Less than or equal to 0.03% sulfur. | Greater than or equal to 80 and less than 120. |
| III | Greater than or equal to 90% saturates. | Less than or equal to 0.03% sulfur. | Greater than or equal to 120. |

In some embodiments, the base oil comprises one or more of the base stocks in Group I, II, III, IV, V or a combination thereof. In other embodiments, the base oil comprises one or more of the base stocks in Group II, III, IV or a combination thereof. In further embodiments, the base oil comprises one or more of the base stocks in Group II, III, IV or a combination thereof wherein the base oil has a kinematic viscosity from about 5 centistokes (cSt) to about 20 cSt, from about 7 cSt to about 16 cSt, or from about 9 cSt to about 15 cSt at 100° C.

The base oil may be selected from the group consisting of natural oils of lubricating viscosity, synthetic oils of lubricating viscosity and mixtures thereof. In some embodiments, the base oil includes base stocks obtained by isomerization of synthetic wax and slack wax, as well as hydrocrackate base stocks produced by hydrocracking (rather than solvent extracting) the aromatic and polar components of the crude. In other embodiments, the base oil of lubricating viscosity includes natural oils, such as animal oils, vegetable oils, mineral oils, oils derived from coal or shale, and combinations thereof. Some non-limiting examples of animal oils include bone oil, lanolin, fish oil, lard oil, dolphin oil, seal oil, shark oil, tallow oil, and whale oil. Some non-limiting examples of vegetable oils include castor oil, olive oil, peanut oil, rapeseed oil, corn oil, sesame oil, cottonseed oil, soybean oil, sunflower oil, safflower oil, hemp oil, linseed oil, tung oil, oiticica oil, jojoba oil, and meadow foam oil. Such oils may be partially or fully hydrogenated. Some non-limiting examples of mineral oils include Groups I, II, and III base stocks, liquid petroleum oils and solvent treated or acid-treated mineral oils of the paraffinic, naphthenic or mixed paraffinic-naphthenic types. In some embodiments, the mineral oils are neat or low viscosity mineral oils.

In some embodiments, the synthetic oils of lubricating viscosity include hydrocarbon oils and halo-substituted hydrocarbon oils such as polymerized and inter-polymerized olefins, alkylbenzenes, polyphenyls, alkylated diphenyl ethers, alkylated diphenyl sulfides, as well as their derivatives, analogues and homologues thereof, and the like. In other embodiments, the synthetic oils include alkylene oxide polymers, interpolymers, copolymers and derivatives thereof wherein the terminal hydroxyl groups can be modified by esterification, etherification, and the like. In further embodiments, the synthetic oils include the esters of dicarboxylic acids with a variety of alcohols. In certain embodiments, the synthetic oils include esters made from $C_5$ to $C_{12}$ monocarboxylic acids and polyols and polyol ethers. In further embodiments, the synthetic oils include tri-alkyl phosphate ester oils, such as tri-n-butyl phosphate and tri-iso-butyl phosphate.

In some embodiments, the synthetic oils of lubricating viscosity include silicon-based oils (such as the polyalkyl-, polyaryl-, polyalkoxy-, polyaryloxy-siloxane oils and silicate oils). In other embodiments, the synthetic oils include liquid esters of phosphorus-containing acids, polymeric tetrahydrofurans, polyalphaolefins, and the like.

Base oil derived from the hydroisomerization of wax may also be used, either alone or in combination with the aforesaid natural and/or synthetic base oil. Such wax isomerate oil is produced by the hydroisomerization of natural or synthetic waxes or mixtures thereof over a hydroisomerization catalyst.

In further embodiments, the base oil comprises a poly-alpha-olefin (PAO). In general, the poly-alpha-olefins may be derived from an alpha-olefin having from about 2 to about 30, from about 4 to about 20, or from about 6 to about 16 carbon atoms. Non-limiting examples of suitable poly-alpha-olefins include those derived from octene, decene, mixtures thereof, and the like. These poly-alpha-olefins may have a viscosity from about 2 to about 15, from about 3 to about 12, or from about 4 to about 8 centistokes at 100° C. In some instances, the poly-alpha-olefins may be used together with other base oils such as mineral oils.

In further embodiments, the base oil comprises a polyalkylene glycol or a polyalkylene glycol derivative, where the terminal hydroxyl groups of the polyalkylene glycol may be modified by esterification, etherification, acetylation and the like. Non-limiting examples of suitable polyalkylene glycols include polyethylene glycol, polypropylene glycol, polyisopropylene glycol, and combinations thereof. Non-limiting examples of suitable polyalkylene glycol derivatives include ethers of polyalkylene glycols (e.g., methyl ether of polyisopropylene glycol, diphenyl ether of polyethylene glycol, diethyl ether of polypropylene glycol, etc.), mono- and polycarboxylic esters of polyalkylene glycols, and combinations thereof. In some instances, the polyalkylene glycol or polyalkylene glycol derivative may be used together with other base oils such as poly-alpha-olefins and mineral oils.

In further embodiments, the base oil comprises any of the esters of dicarboxylic acids (e.g., phthalic acid, succinic acid, alkyl succinic acids, alkenyl succinic acids, maleic acid, azelaic acid, suberic acid, sebacic acid, fumaric acid, adipic acid, linoleic acid dimer, malonic acid, alkyl malonic acids, alkenyl malonic acids, and the like) with a variety of alcohols (e.g., butyl alcohol, hexyl alcohol, dodecyl alcohol, 2-ethylhexyl alcohol, ethylene glycol, diethylene glycol monoether, propylene glycol, and the like). Non-limiting examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, and the like.

In further embodiments, the base oil comprises a hydrocarbon prepared by the Fischer-Tropsch process. The Fischer-Tropsch process prepares hydrocarbons from gases containing hydrogen and carbon monoxide using a Fischer-Tropsch catalyst. These hydrocarbons may require further processing in order to be useful as base oils. For example, the hydrocarbons may be dewaxed, hydroisomerized, and/or hydrocracked using processes known to a person of ordinary skill in the art.

In further embodiments, the base oil comprises an unrefined oil, a refined oil, a rerefined oil, or a mixture thereof. Unrefined oils are those obtained directly from a natural or synthetic source without further purification treatment. Non-limiting examples of unrefined oils include shale oils obtained directly from retorting operations, petroleum oils obtained directly from primary distillation, and ester oils obtained directly from an esterification process and used without further treatment. Refined oils are similar to the unrefined oils except the former have been further treated by one or more purification processes to improve one or more properties. Many such purification processes are known to those skilled in the art such as solvent extraction, secondary distillation, acid or base extraction, filtration, percolation, and the like. Rerefined oils are obtained by applying to refined oils processes similar to those used to obtain refined oils. Such rerefined oils are also known as reclaimed or reprocessed oils and often are additionally treated by processes directed to removal of spent additives and oil breakdown products.

B. Lubricating Oil Additives

Optionally, the lubricating oil composition may further comprise at least an additive or a modifier (hereinafter designated as "additive") that can impart or improve any desirable property of the lubricating oil composition. Any additive known to a person of ordinary skill in the art may be used in the lubricating oil compositions disclosed herein. Some suitable additives have been described in Mortier et al., "*Chemistry and Technology of Lubricants,*" 2nd Edition, London, Springer, (1996); and Leslie R. Rudnick, "*Lubricant Additives: Chemistry and Applications,*" New York, Marcel Dekker (2003), both of which are incorporated herein by reference. In some embodiments, the additive can be selected from the group consisting of antioxidants, antiwear agents, detergents, rust inhibitors, demulsifiers, friction modifiers, multifunctional additives, viscosity index improvers, pour point depressants, foam inhibitors, metal deactivators, dispersants, corrosion inhibitors, lubricity improvers, thermal stability improvers, anti-haze additives, icing inhibitors, dyes, markers, static dissipaters, biocides and combinations thereof. In general, the concentration of each of the additives in the lubricating oil composition, when used, may range from about 0.001 wt. % to about 10 wt. %, from about 0.01 wt. % to about 5 wt. %, or from about 0.1 wt. % to about 2.5 wt. %, based on the total weight of the lubricating oil composition. Further, the total amount of the additives in the lubricating oil composition may range from about 0.001 wt. % to about 20 wt. %, from about 0.01 wt. % to about 10 wt. %, or from about 0.1 wt. % to about 5 wt. %, based on the total weight of the lubricating oil composition.

The lubricating oil composition disclosed herein can optionally comprise an anti-wear agent that can reduce friction and excessive wear. Any anti-wear agent known by a person of ordinary skill in the art may be used in the lubricating oil composition. Non-limiting examples of suitable antiwear agents include zinc dithiophosphate, metal (e.g., Pb, Sb, Mo and the like) salts of dithiophosphate, metal (e.g., Zn, Pb, Sb, Mo and the like) salts of dithiocarbamate, metal (e.g., Zn, Pb, Sb and the like) salts of fatty acids, boron compounds, phosphate esters, phosphite esters, amine salts of phosphoric acid esters or thiophosphoric acid esters, reaction products of dicyclopentadiene and thiophosphoric acids and combinations thereof. The amount of the anti-wear agent may vary from about 0.01 wt. % to about 5 wt. %, from about 0.05 wt. % to about 3 wt. %, or from about 0.1 wt. % to about 1 wt. %, based on the total weight of the lubricating oil composition. Some suitable anti-wear agents have been described in Leslie R. Rudnick, "*Lubricant Additives: Chemistry and Applications,*" New York, Marcel Dekker, Chapter 8, pages 223-258 (2003), which is incorporated herein by reference.

In certain embodiments, the anti-wear agent is or comprises a dihydrocarbyl dithiophosphate metal salt, such as zinc dialkyl dithiophosphate compounds. The metal of the dihydrocarbyl dithiophosphate metal salt may be an alkali or alkaline earth metal, or aluminum, lead, tin, molybdenum, manganese, nickel or copper. In some embodiments, the metal is zinc. In other embodiments, the alkyl group of the dihydrocarbyl dithiophosphate metal salt has from about 3 to about 22 carbon atoms, from about 3 to about 18 carbon atoms, from about 3 to about 12 carbon atoms, or from about 3 to about 8 carbon atoms. In further embodiments, the alkyl group is linear or branched.

The amount of the dihydrocarbyl dithiophosphate metal salt including the zinc dialkyl dithiophosphate salts in the lubricating oil composition disclosed herein is measured by its phosphorus content. In some embodiments, the phosphorus content of the lubricating oil composition disclosed herein is from about 0.01 wt. % to about 0.12 wt. %, from about 0.1 wt. % to about 0.10 wt. %, or from about 0.2 wt. % to about 0.8 wt. %, based on the total weight of the lubricating oil composition.

The dihydrocarbyl dithiophosphate metal salt may be prepared in accordance with known techniques by first forming a dihydrocarbyl dithiophosphoric acid (DDPA), usually by reacting one or more of alcohols and phenol compounds with $P_2S_5$ and then neutralizing the formed DDPA with a compound of the metal, such as an oxide, hydroxide or carbonate of the metal. In some embodiments, a DDPA may be made by reacting mixtures of primary and secondary alcohols with $P_2S_5$. In other embodiments, two or more dihydrocarbyl dithiophosphoric acids can be prepared where the hydrocarbyl groups on one are entirely secondary in character and the hydrocarbyl groups on the others are entirely primary in character. The zinc salts can be prepare from the dihydrocarbyl dithiophosphoric acids by reacting with a zinc compound. In some embodiments, a basic or a neutral zinc compound is used. In other embodiments, an oxide, hydroxide or carbonate of zinc is used.

In some embodiments, oil soluble zinc dialkyl dithiophosphates may be produced from dialkyl dithiophosphoric acids represented by formula (II):

wherein each of $R^8$ and $R^9$ is independently linear or branched alkyl or linear or branched substituted alkyl. In some embodiments, the alkyl group has from about 3 to about 30 carbon atoms or from about 3 to about 8 carbon atoms.

The dialkyldithiophosphoric acids of formula (II) can be prepared by reacting alcohols $R^8OH$ and $R^9OH$ with $P_2S_5$ where $R^8$ and $R^9$ are as defined above. In some embodiments, $R^8$ and $R^9$ are the same. In other embodiments, $R^8$ and $R^9$ are different. In further embodiments, $R^8OH$ and $R^9OH$ react with $P_2S_5$ simultaneously. In still further embodiments, $R^8OH$ and $R^9OH$ react with $P_2S_5$ sequentially.

Mixtures of hydroxyl alkyl compounds may also be used. These hydroxyl alkyl compounds need not be monohydroxy alkyl compounds. In some embodiments, the dialkyldithiophosphoric acids is prepared from mono-, di-, tri-, tetra-, and other polyhydroxy alkyl compounds, or mixtures of two or more of the foregoing. In other embodiments, the zinc dialkyldithiophosphate derived from only primary alkyl alcohols is derived from a single primary alcohol. In further embodiments, that single primary alcohol is 2-ethylhexanol. In certain embodiments, the zinc dialkyldithiophosphate derived from only secondary alkyl alcohols. In further embodiments, that mixture of secondary alcohols is a mixture of 2-butanol and 4-methyl-2-pentanol.

The phosphorus pentasulfide reactant used in the dialkyldithiophosphoric acid formation step may contain certain amounts of one or more of $P_2S_3$, $P_4S_3$, $P_4S_7$, or $P_4S_9$. Compositions as such may also contain minor amounts of free sulfur. In certain embodiments, the phosphorus pentasulfide reactant is substantially free of any of $P_2S_3$, $P_4S_3$, $P_4S_7$, and $P_4S_9$. In certain embodiments, the phosphorus pentasulfide reactant is substantially free of free sulfur.

In the present invention, the sulfated ash content of the total lubricating oil composition is less than 5 wt. %, less than 4 wt. %, less than 3 wt. %, less than 2 wt. %, or less than 1 wt. %, as measured according to ASTM D874.

Optionally, the lubricating oil composition disclosed herein can further comprise an additional detergent. Any compound or a mixture of compounds that can reduce or slow the build up of engine deposits can be used as a detergent. Some non-limiting examples of suitable detergents include polyolefin substituted succinimides or succinamides of polyamines, for instance polyisobutylene succinimides or polyisobutylene amine succinamides, aliphatic amines, Mannich bases or amines and polyolefin (e.g. polyisobutylene) maleic anhydrides. Some suitable succinimide detergents are described in GB960493, EP0147240, EP0482253, EP0613938, EP0557561 and WO 98/42808, all of which are incorporated herein by reference. In some embodiments, the detergent is a polyolefin substituted succinimide such as polyisobutylene succinimide. Some non-limiting examples of commercially available detergent additives include F7661 and F7685 (available from Infineum, Linden, N.J.) and OMA 4130D (available from Octel Corporation, Manchester, UK).

Some non-limiting examples of suitable metal detergent include sulfurized or unsulfurized alkyl or alkenyl phenates, alkyl or alkenyl aromatic sulfonates, borated sulfonates, sulfurized or unsulfurized metal salts of multi-hydroxy alkyl or alkenyl aromatic compounds, alkyl or alkenyl hydroxy aromatic sulfonates, sulfurized or unsulfurized alkyl or alkenyl naphthenates, metal salts of alkanoic acids, metal salts of an alkyl or alkenyl multiacid, and chemical and physical mixtures thereof. Other non-limiting examples of suitable metal detergents include metal sulfonates, salicylates, phosphonates, thiophosphonates and combinations thereof. The metal can be any metal suitable for making sulfonate, salicylate or phosphonate detergents. Non-limiting examples of suitable metals include alkali metals, alkaline metals and transition metals. In some embodiments, the metal is Ca, Mg, Ba, K, Na, Li or the like.

Generally, the amount of the detergent additive can be less than 10,000 ppm, less than 1000 ppm, less than 100 ppm, or less than 10 ppm, based on the total weight of the lubricating oil composition. In some embodiments, the amount of the detergent is from about 0.001 wt. % to about 5 wt. %, from about 0.05 wt. % to about 3 wt. %, or from about 0.1 wt. % to about 1 wt. %, based on the total weight of the lubricating oil composition. Some suitable detergents have been described in Mortier et al., "Chemistry and Technology of Lubricants," 2nd Edition, London, Springer, Chapter 3, pages 75-85 (1996); and Leslie R. Rudnick, "Lubricant Additives: Chemistry and Applications," New York, Marcel Dekker, Chapter 4, pages 113-136 (2003), both of which are incorporated herein by reference.

In certain embodiments, the lubricating oil composition disclosed herein comprises an antioxidant that can reduce or prevent the oxidation of the base oil. Any antioxidant known by a person of ordinary skill in the art may be used in the lubricating oil composition. Non-limiting examples of suitable antioxidants include amine-based antioxidants (e.g., alkyl diphenylamines, phenyl-α-naphthylamine, alkyl or arylalkyl substituted phenyl-α-naphthylamine, alkylated p-phenylene diamines, tetramethyl-diaminodiphenylamine and the like), phenolic antioxidants (e.g., 2-tert-butylphenol, 4-methyl-2,6-di-tert-butylphenol, 2,4,6-tri-tert-butylphenol, 2,6-di-tert-butyl-p-cresol, 2,6-di-tert-butylphenol, 4,4'-methylenebis-(2,6-di-tert-butylphenol), 4,4'-thiobis(6-di-tert-butyl-o-cresol) and the like), sulfur-based antioxidants (e.g., dilauryl-3,3'-thiodipropionate, sulfurized phenolic antioxidants and the like), phosphorous-based antioxidants (e.g., phosphites and the like), zinc dithiophosphate, oil-soluble copper compounds and combinations thereof. The amount of the antioxidant may vary from about 0.01 wt. % to about 10 wt. %, from about 0.05 wt. % to about 5 wt. %, or from about 0.1 wt. % to about 3 wt. %, based on the total weight of the lubricating oil composition. Some suitable antioxidants have been described in Leslie R. Rudnick, "Lubricant Additives: Chemistry and Applications," New York, Marcel Dekker, Chapter 1, pages 1-28 (2003), which is incorporated herein by reference.

In some embodiments, the antioxidant is or comprises a diarylamine. Some non-limiting examples of suitable diarylamine compound include diphenylamine, phenyl-α-naphthylamine, alkylated diarylamines such as alkylated diphenylamines and alkylated phenyl-α-naphthylamines. In some embodiments, the diarylamine compound is an alkylated diphenylamine. The diarylamine compound may be used alone or in combination with other lubricating oil additives including other diarylamine compounds.

In one embodiment, the alkylated diphenylamines can be represented by formula (I):

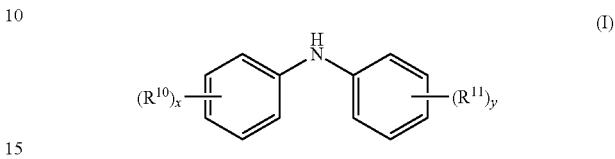

(I)

wherein each of $R^{10}$ and $R^{11}$ is independently hydrogen or an arylalkyl group having from about 7 to about 20 or from about 7 to about 10 carbons atoms; or a linear or branched alkyl group having from about 1 to about 24 carbon atoms; and each of x and y is independently 0, 1, 2, or 3, provided that at least one aromatic ring contains an arylalkyl group or a linear or branched alkyl group. In some embodiments, each of $R^{10}$ and $R^{11}$ is independently an alkyl group containing from about 4 to about 20, from about 4 to 16, from about 4 to about 12 carbon atoms, or from about 4 to about 8 carbon atoms.

In some embodiments, the alkylated diphenylamine includes, but is not limited to, bis-nonylated diphenylamine, bis-octylated diphenylamine, and octylated/butylated diphenylamine. In other embodiments, the alkylated diphenylamine comprises a first compound of formula (I) where each of $R^{10}$ and $R^{11}$ is independently octyl; and each of x and y is 1. In further embodiments, the alkylated diphenylamine comprises a second compound of formula (I) where each of $R^{10}$ and $R^{11}$ is independently butyl; and each of x and y is 1. In still further embodiments, the alkylated diphenylamine comprises a third compound of formula (I) where $R^{10}$ is octyl and $R^{11}$ is butyl; and each of x and y is 1. In still further embodiments, the alkylated diphenylamine comprises a fourth compound of formula (I) where $R^{10}$ is octyl; x is 2 and y is 0. In still further embodiments, the alkylated diphenylamine comprises a fifth compound of formula (I) where $R^{10}$ is butyl; x is 2 and y is 0. In certain embodiments, the alkylated diphenylamine comprises the first compound, second compound, third compound, fourth compound, fifth compound or a combination thereof.

In certain embodiments, the amount of the diarylamine compound, such as the alkylated diphenylamines, in the lubricating oil compositions disclosed herein is at least about 0.1 wt. %, at least about 0.2 wt. %, at least about 0.3 wt. %, at least about 0.4 wt. %, at least about 0.5 wt. %, at least about 1.0 wt. %, at least about 1.5 wt. %, at least about 2 wt. %, or at least about 5 wt. %, based on the total weight of the lubricating oil composition.

The lubricating oil composition disclosed herein can optionally comprise a dispersant that can prevent sludge, varnish, and other deposits by keeping particles suspended in a colloidal state. Any dispersant known by a person of ordinary skill in the art may be used in the lubricating oil composition. Non-limiting examples of suitable dispersants include alkenyl succinimides, alkenyl succinimides modified with other organic compounds, alkenyl succinimides modified by post-treatment with ethylene carbonate or boric acid, succiamides, succinate esters, succinate ester-amides, pentaerythritols, phenate-salicylates and their post-treated analogs, alkali metal or mixed alkali metal, alkaline earth metal borates, dispersions of hydrated alkali metal borates, dispersions of alkaline-earth metal borates, polyamide ashless dispersants, benzylamines, Mannich type dispersants, phosphorus-containing dispersants, and combinations thereof. The amount of the dispersant may vary from about 0.01 wt. % to about 10 wt. %, from about 0.05 wt. % to about 7 wt. %, or from about 0.1 wt. % to about 4 wt. %, based on the total weight of the lubricating oil composition. Some suitable dispersants have been described in Mortier et al., "*Chemistry and Technology of Lubricants,*" 2nd Edition, London, Springer, Chapter 3, pages 86-90 (1996); and Leslie R. Rudnick, "*Lubricant Additives: Chemistry and Applications,*" New York, Marcel Dekker, Chapter 5, pages 137-170 (2003), both of which are incorporated herein by reference.

The lubricating oil composition disclosed herein can optionally comprise a friction modifier that can lower the friction between moving parts. Any friction modifier known by a person of ordinary skill in the art may be used in the lubricating oil composition. Non-limiting examples of suitable friction modifiers include fatty carboxylic acids; derivatives (e.g., alcohol, esters, borated esters, amides, metal salts and the like) of fatty carboxylic acid; mono-, di- or tri-alkyl substituted phosphoric acids or phosphonic acids; derivatives (e.g., esters, amides, metal salts and the like) of mono-, di- or tri-alkyl substituted phosphoric acids or phosphonic acids; mono-, di- or tri-alkyl substituted amines; mono- or di-alkyl substituted amides and combinations thereof. In some embodiments, the friction modifier is selected from the group consisting of aliphatic amines, ethoxylated aliphatic amines, aliphatic carboxylic acid amides, ethoxylated aliphatic ether amines, aliphatic carboxylic acids, glycerol esters, aliphatic carboxylic ester-amides, fatty imidazolines, fatty tertiary amines, wherein the aliphatic or fatty group contains more than about eight carbon atoms so as to render the compound suitably oil soluble. In other embodiments, the friction modifier comprises an aliphatic substituted succinimide formed by reacting an aliphatic succinic acid or anhydride with ammonia or a primary amine. The amount of the friction modifier may vary from about 0.01 wt. % to about 10 wt. %, from about 0.05 wt. % to about 5 wt. %, or from about 0.1 wt. % to about 3 wt. %, based on the total weight of the lubricating oil composition. Some suitable friction modifiers have been described in Mortier et al., "*Chemistry and Technology of Lubricants,*" 2nd Edition, London, Springer, Chapter 6, pages 183-187 (1996); and Leslie R. Rudnick, "*Lubricant Additives: Chemistry and Applications,*" New York, Marcel Dekker, Chapters 6 and 7, pages 171-222 (2003), both of which are incorporated herein by reference.

The lubricating oil composition disclosed herein can optionally comprise a pour point depressant that can lower the pour point of the lubricating oil composition. Any pour point depressant known by a person of ordinary skill in the art may be used in the lubricating oil composition. Non-limiting examples of suitable pour point depressants include polymethacrylates, alkyl acrylate polymers, alkyl methacrylate polymers, di(tetra-paraffin phenol)phthalate, condensates of tetra-paraffin phenol, condensates of a chlorinated paraffin with naphthalene and combinations thereof. In some embodiments, the pour point depressant comprises an ethylene-vinyl acetate copolymer, a condensate of chlorinated paraffin and phenol, polyalkyl styrene or the like. The amount of the pour point depressant may vary from about 0.01 wt. % to about 10 wt. %, from about 0.05 wt. % to about 5 wt. %, or from about 0.1 wt. % to about 3 wt. %, based on the total weight of the lubricating oil composition. Some suitable pour point depressants have been described in Mortier et al., "*Chemistry and Technology of Lubricants,*" 2nd Edition, London, Springer, Chapter 6, pages 187-189 (1996); and Leslie R. Rudnick, "*Lubricant Additives: Chemistry and Applications,*" New York, Marcel Dekker, Chapter 11, pages 329-354 (2003), both of which are incorporated herein by reference.

The lubricating oil composition disclosed herein can optionally comprise a demulsifier that can promote oil-water separation in lubricating oil compositions that are exposed to water or steam. Any demulsifier known by a person of ordinary skill in the art may be used in the lubricating oil composition. Non-limiting examples of suitable demulsifiers include anionic surfactants (e.g., alkyl-naphthalene sulfonates, alkyl benzene sulfonates and the like), nonionic alkoxylated alkyl phenol resins, polymers of alkylene oxides (e.g., polyethylene oxide, polypropylene oxide, block copolymers of ethylene oxide, propylene oxide and the like), esters of oil soluble acids, polyoxyethylene sorbitan ester and combinations thereof. The amount of the demulsifier may vary from about 0.01 wt. % to about 10 wt. %, from about 0.05 wt. % to about 5 wt. %, or from about 0.1 wt. % to about 3 wt. %, based on the total weight of the lubricating oil composition. Some suitable demulsifiers have been described in Mortier et al., "*Chemistry and Technology of Lubricants,*" 2nd Edition, London, Springer, Chapter 6, pages 190-193 (1996), which is incorporated herein by reference.

The lubricating oil composition disclosed herein can optionally comprise a foam inhibitor or an anti-foam that can break up foams in oils. Any foam inhibitor or anti-foam known by a person of ordinary skill in the art may be used in the lubricating oil composition. Non-limiting examples of suitable anti-foams include silicone oils or polydimethylsiloxanes, fluorosilicones, alkoxylated aliphatic acids, polyethers (e.g., polyethylene glycols), branched polyvinyl ethers, alkyl acrylate polymers, alkyl methacrylate polymers, polyalkoxyamines and combinations thereof. In some embodiments, the anti-foam comprises glycerol monostearate, polyglycol palmitate, a trialkyl monothiophosphate, an ester of sulfonated ricinoleic acid, benzoylacetone, methyl salicylate, glycerol monooleate, or glycerol dioleate. The amount of the anti-foam may vary from about 0.01 wt. % to about 5 wt. %, from about 0.05 wt. % to about 3 wt. %, or from about 0.1 wt. % to about 1 wt. %, based on the total weight of the lubricating oil composition. Some suitable anti-foams have been described in Mortier et al., "*Chemistry and Technology of Lubricants,*" 2nd Edition, London, Springer, Chapter 6, pages 190-193 (1996), which is incorporated herein by reference.

The lubricating oil composition disclosed herein can optionally comprise a corrosion inhibitor that can reduce corrosion. Any corrosion inhibitor known by a person of ordinary skill in the art may be used in the lubricating oil composition. Non-limiting examples of suitable corrosion inhibitor include half esters or amides of dodecylsuccinic acid, phosphate esters, thiophosphates, alkyl imidazolines, sarcosines and combinations thereof. The amount of the corrosion inhibitor may vary from about 0.01 wt. % to about 5 wt. %, from about 0.05 wt. % to about 3 wt. %, or from about 0.1 wt. % to about 1 wt. %, based on the total weight of the lubricating oil composition. Some suitable corrosion inhibitors have been described in Mortier et al., "*Chemistry and Technology of Lubricants,*" 2nd Edition, London, Springer, Chapter 6, pages 193-196 (1996), which is incorporated herein by reference.

The lubricating oil composition disclosed herein can optionally comprise an extreme pressure (EP) agent that can prevent sliding metal surfaces from seizing under conditions of extreme pressure. Any extreme pressure agent known by a person of ordinary skill in the art may be used in the lubricating oil composition. Generally, the extreme pressure agent is a compound that can combine chemically with a metal to form a surface film that prevents the welding of asperities in opposing metal surfaces under high loads. Non-limiting examples of suitable extreme pressure agents include sulfurized animal or vegetable fats or oils, sulfurized animal or vegetable fatty acid esters, fully or partially esterified esters of trivalent or pentavalent acids of phosphorus, sulfurized olefins, dihydrocarbyl polysulfides, sulfurized Diels-Alder adducts, sulfurized dicyclopentadiene, sulfurized or co-sulfurized mixtures of fatty acid esters and monounsaturated olefins, co-sulfurized blends of fatty acid, fatty acid ester and alpha-olefin, functionally-substituted dihydrocarbyl polysulfides, thia-aldehydes, thia-ketones, epithio compounds, sulfur-containing acetal derivatives, co-sulfurized blends of terpene and acyclic olefins, and polysulfide olefin products, amine salts of phosphoric acid esters or thiophosphoric acid esters and combinations thereof. The amount of the extreme pressure agent may vary from about 0.01 wt. % to about 5 wt. %, from about 0.05 wt. % to about 3 wt. %, or from about 0.1 wt. % to about 1 wt. %, based on the total weight of the lubricating oil composition. Some suitable extreme pressure agents have been described in Leslie R. Rudnick, "*Lubricant Additives: Chemistry and Applications,*" New York, Marcel Dekker, Chapter 8, pages 223-258 (2003), which is incorporated herein by reference.

The lubricating oil composition disclosed herein can optionally comprise a rust inhibitor that can inhibit the corrosion of ferrous metal surfaces. Any rust inhibitor known by a person of ordinary skill in the art may be used in the lubricating oil composition. Non-limiting examples of suitable rust inhibitors include oil-soluble monocarboxylic acids (e.g., 2-ethylhexanoic acid, lauric acid, myristic acid, palmitic acid, oleic acid, linoleic acid, linolenic acid, behenic acid, cerotic acid and the like), oil-soluble polycarboxylic acids (e.g., those produced from tall oil fatty acids, oleic acid, linoleic acid and the like), alkenylsuccinic acids in which the alkenyl group contains 10 or more carbon atoms (e.g., tetrapropenylsuccinic acid, tetradecenylsuccinic acid, hexadecenylsuccinic acid, and the like); long-chain alpha, omega-dicarboxylic acids having a molecular weight in the range of 600 to 3000 daltons and combinations thereof. The amount of the rust inhibitor may vary from about 0.01 wt. % to about 10 wt. %, from about 0.05 wt. % to about 5 wt. %, or from about 0.1 wt. % to about 3 wt. %, based on the total weight of the lubricating oil composition.

Other non-limiting examples of suitable rust inhibitors include nonionic polyoxyethylene surface active agents such as polyoxyethylene lauryl ether, polyoxyethylene higher alcohol ether, polyoxyethylene nonyl phenyl ether, polyoxyethylene octyl phenyl ether, polyoxyethylene octyl stearyl ether, polyoxyethylene oleyl ether, polyoxyethylene sorbitol monostearate, polyoxyethylene sorbitol mono-oleate, and polyethylene glycol mono-oleate. Further non-limiting examples of suitable rust inhibitor include stearic acid and other fatty acids, dicarboxylic acids, metal soaps, fatty acid amine salts, metal salts of heavy sulfonic acid, partial carboxylic acid ester of polyhydric alcohol, and phosphoric ester.

In some embodiments, the lubricating oil composition comprises at least a multifunctional additive. Some non-limiting examples of suitable multifunctional additives include sulfurized oxymolybdenum dithiocarbamate, sulfurized oxymolybdenum organophosphorodithioate, oxymolybdenum monoglyceride, oxymolybdenum diethylate amide, amine-molybdenum complex compound, and sulfur-containing molybdenum complex compound.

In certain embodiments, the lubricating oil composition comprises at least a viscosity index improver. Some non-limiting examples of suitable viscosity index improvers include polymethacrylate type polymers, ethylene-propylene copolymers, styrene-isoprene copolymers, hydrated styrene-isoprene copolymers, polyisobutylene, and dispersant type viscosity index improvers.

In some embodiments, the lubricating oil composition comprises at least a metal deactivator. Some non-limiting examples of suitable metal deactivators include disalicylidene propylenediamine, triazole derivatives, thiadiazole derivatives, and mercaptobenzimidazoles.

The additives disclosed herein may be in the form of an additive concentrate having more than one additive. The additive concentrate may comprise a suitable diluent, such as a hydrocarbon oil of suitable viscosity. Such diluent can be selected from the group consisting of natural oils (e.g., mineral oils), synthetic oils and combinations thereof. Some non-limiting examples of the mineral oils include paraffin-based oils, naphthenic-based oils, asphaltic-based oils and combinations thereof. Some non-limiting examples of the synthetic base oils include polyolefin oils (especially hydrogenated alpha-olefin oligomers), alkylated aromatic, polyalkylene oxides, aromatic ethers, and carboxylate esters (especially diester oils) and combinations thereof. In some embodiments, the diluent is a light hydrocarbon oil, both natural or synthetic. Generally, the diluent oil can have a viscosity from about 13 centistokes to about 35 centistokes at 40° C.

D. Processes of Preparing Lubricating Oil Compositions

The lubricating oil compositions disclosed herein can be prepared by any method known to a person of ordinary skill in the art for making lubricating oils. In some embodiments, the base oil can be blended or mixed with a sulfurized metal alkyl phenate composition disclosed herein. Optionally, one or more other additives in additional to the metal alkyl phenate can be added. The sulfurized metal alkyl phenate composition, the optional additives may be added to the base oil individually or simultaneously. In some embodiments, the sulfurized metal alkyl phenate composition, the optional additives are added to the base oil individually in one or more additions and the additions may be in any order. In other embodiments, the sulfurized metal alkyl phenate composition, the optional additives are added to the base oil simultaneously, optionally in the form of an additive concentrate. In some embodiments, the solubilizing of the sulfurized metal alkyl phenate composition, and any solid additives in the base oil may be assisted by heating the mixture to a temperature from about 25° C. to about 200° C., from about 50° C. to about 150° C. or from about 75° C. to about 125° C.

Any mixing or dispersing equipment known to a person of ordinary skill in the art may be used for blending, mixing or solubilizing the ingredients. The blending, mixing or solubilizing may be carried out with a blender, an agitator, a disperser, a mixer (e.g., planetary mixers and double planetary mixers), a homogenizer (e.g., Gaulin homogenizers and Rannie homogenizers), a mill (e.g., colloid mill, ball mill and sand mill) or any other mixing or dispersing equipment known in the art.

E. Application of the Lubricating Oil Compositions

The lubricating oil composition disclosed herein may be suitable for use as motor oils (or engine oils or crankcase oils), transmission fluids, gear oils, power steering fluids, shock absorber fluids, brake fluids, hydraulic fluids and/or greases.

In some embodiments, the lubricating oil composition disclosed herein is a motor or engine oil. Such an motor oil composition may be used to lubricate all major moving parts in any reciprocating internal combustion engine, reciprocating compressors and in steam engines of crankcase design. In automotive applications, the motor oil composition may also be used to cool hot engine parts, keep the engine free of rust and deposits, and seal the rings and valves against leakage of combustion gases. The motor oil composition may comprise a base oil, a sulfurized metal alkyl phenate composition disclosed herein, and an optional additive. In some embodiments, the motor oil composition further comprises a pour point depressant, a detergent, a dispersant, an anti-wear, an antioxidant, a friction modifier, a rust inhibitor, or a combination thereof.

In other embodiments, the lubricating oil composition disclosed herein is a gear oil for either automotive or industrial applications. The gear oil composition may be used to lubricate gears, rear axles, automotive transmissions, final drive axles, accessories in agricultural and construction equipment, gear housings and enclosed chain drives. The gear oil composition may comprise a base oil, a sulfurized metal alkyl phenate composition disclosed herein, and an optional additive. In some embodiments, the gear oil composition further comprises an anti-wear, an extreme pressure agent, a rust inhibitor, or a combination thereof.

In further embodiments, the lubricating oil composition disclosed herein is a transmission fluid. The transmission fluid composition may be used in either automatic transmission or manual transmission to reduce transmission losses. The transmission fluid composition may comprise a base oil, a sulfurized metal alkyl phenate composition disclosed herein, and an optional additive. In some embodiments, the transmission fluid composition further comprises a friction modifier, a detergent, a dispersant, an antioxidant, an anti-wear agent, an extreme pressure agent, a pour point depressant, an anti-foam, a corrosion inhibitor or a combination thereof.

In further embodiments, the lubricating oil composition disclosed herein is a grease used in various applications where extended lubrication is required and where oil would not be retained, e.g., on a vertical shaft. The grease composition may comprise a base oil, a sulfurized metal alkyl phenate composition disclosed herein, an optional additive and a thickener. In some embodiments, the grease composition further comprise a complexing agent, an antioxidant, an anti-wear agent, an extreme pressure agent, an anti-foam, a corrosion inhibitor or a mixture thereof. In some embodiments, the thickener is a soap formed by reacting a metal hydroxide (e.g., lithium hydroxide, sodium hydroxide, potassium hydroxide, calcium hydroxide, zinc hydroxide and the like) with a fat, a fatty acid, or an ester. In general, the type of soap used depends on the grease properties desired. In other embodiments, the thickener may be a non-soap thickener selected from the group consisting of clays, silica gels, carbon black, various synthetic organic materials and combinations thereof. In further embodiments, the thickener comprises a combination of soaps and non-soap thickeners.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The following examples are intended for illustrative purposes only and do not limit in any way the scope of the present invention. In some of the examples, phenolic resins were formed by reacting tetrapropenyl phenol (TPP) as the phenol compound with paraformaldehyde (PF) as the aldehyde at a specific PF/TPP ratio, i.e., charge mole ratio (CMR). In some Examples, the phenolic resins were reacted with calcium hydroxide and sulfur to give sulfurized calcium products which had lower levels of residual TPP.

Example 1

Comparative

Preparation of a Conventional Sulfurized Calcium Alkyl Phenate

A 4-liter reactor was charged with 719 g (2.74 mol) of tetrapropenyl phenol (available from Chevron Oronite Company LLC, San Ramon, Calif.), 450 g of 100 neutral lube oil (Exxon 100N, available from Exxon Corporation), 338 g (4.57 mol) of calcium hydroxide, 553 g of isodecanol and 130 g (4.06 mol) of powdered sulfur. The reaction mixture was heated to 150° C. with mixing. The reaction mixture was then charged with 134 g of ethylene glycol and 72 g of a low overbased alkylbenzene sulfonate (available from Chevron Oronite Company LLC, San Ramon, Calif.) (TBN=17) over a 30-minute period. The reaction mixture was heated to 175° C. over a period of 60 minutes and held at 175° C. for an additional 60 minutes before a sample (Sample A) was taken from the reaction mixture and tested. 8 g (0.25 mol) of Sulfur powder was then added to the remaining reaction mixture, which was held for another 60 minutes at 177° C. before another sample (Sample B) was taken from the reaction mixture and tested. The remaining reaction mixture was heated to 210° C. under vacuum to distill out the solvents before a further sample (Sample C) was taken from the reaction mixture and tested. The results for this and the additional examples below were normalized so that the weight of alkyl phenol charged was 39 wt. % of the final product weight.

Example 2

Reaction of Tetrapropenyl Phenol with Paraformaldehyde at CMR of 0.5 and 1.0

A 2-liter reactor was charged with 1048 g (4 gram moles) of tetrapropenyl phenol [TPP] (available from Chevron Oronite Company LLC) and 60 g (2 gram moles) of paraformaldehyde [PF]. The reaction mixture was heated to 110° C. with mixing. Over a 15-minute period, 66 g (0.15 mol) of a $C_{20}$-$C_{24}$ alkylbenzene sulfonic acid derived from $C_{20}$-$C_{24}$ olefins was added, yielding Sample D. Sample D was a viscous liquid with a residual TPP content of 23.9 wt. % (PF/TPP CMR=0.5). The remaining reaction mixture was cooled to 65° C. with another 66 g (2.2 mol) of paraformaldehyde added before heating to 110° C., yielding Sample E. Sample E was in solid form and had a residual TPP content of 0.2 wt. % (PF/TPP CMR=1.0).

Example 3

Reaction of Tetrapropenyl Phenol with Paraformaldehyde at CMR of 0.25, 0.32, and 0.40.

A 1-liter reactor was charged with 524 g (2 gram moles) of tetrapropenyl phenol (available from Chevron Oronite Company LLC, San Ramon, Calif.) and 15 g (0.5 gram moles) of paraformaldehyde. The reaction mixture was heated to 110°

C. with mixing. Over a 15-minute period, 33 g (0.08 mol) of alkylbenzene sulfonic acid derived from $C_{20}$-$C_{24}$ α-olefins was added. After 20 minutes, a sample (Sample F) was taken from the reaction mixture and tested. Sample F had a residual TPP content of 51 wt. %. Additional 7.5 g (0.25 gram moles) of paraformaldehyde was added to the remaining reaction mixture. After 30 minutes, a sample (Sample G) was taken from the reaction mixture and tested. Sample G had a residual TPP content of 35.9 wt. %. Additional 7.5 g (0.25 gram moles) of paraformaldehyde was then added to the remaining reaction mixture. After 60 minutes, a sample (Sample H) was taken from reaction mixture and tested. Sample H had a residual TPP content of 20.4 wt. %.

Example 4

Preparation of Overbased Sulfurized Alklyphenol Formaldehyde Phenates

A 4-liter reactor was charged with 719 g (2.74 gram moles) of tetrapropenyl phenol (available from Chevron Oronite Company LLC, San Ramon, Calif.), 550 g of 100 neutral oil (Exxon 100N, available from Exxon Corporation)_and 20.6 g (0.687 gram moles) of paraformaldehyde. The reaction mixture was heated to 110° C. Over a 15-minute period, 45.3 g (0.10 mol) of a $C_{20}$-$C_{24}$ alkylbenzene sulfonic acid derived from $C_{20}$-$C_{24}$ olefins was added. After that, 406 g of isodecanol, 338 g (4.57 mol) of calcium hydroxide and 113 g (3.53 mol) of sulfur powder were added to the reaction mixture. The reaction mixture was then heated to 150° C. over a period of 30 minutes. The reaction mixture was charged with 206 g of ethylene glycol over another period of 30 minutes. The reaction mixture was then heated to 177° C. over a period of 60 minutes before 101.3 g (2.30 mol) of carbon dioxide was sparged into the reaction mixture over a period of 180 minutes. The reaction mixture was heated to 205° C. under vacuum to remove solvents and was filtered using diatomaceous clay to provide Sample I. Sample I is characterized by the following analytical data: TBN=283 mg KOH/g; Viscosity at 250 TBN=208 cSt (at 100° C.); Sulfur content=4.1 wt. %; Ca content=10.6 wt. %; and residual TPP content=4.4 wt. %.

Example 5

Reaction of Overbased Sulfurized Alkyphenol Formaldehyde Resin with Additional Sulfur A 1-liter reactor was charged with 250 g of Sample I (phenolic resin) prepared in Example 4 and 5 g (0.156 mol) of powdered sulfur. The reaction mixture was heated to 177° C. and held for one hour. The reaction mixture was then heated to 210° C. under vacuum and held at 210° C. for 20 minutes, providing Sample J. Sample J is characterized by the following analytical data: Sulfur content=5.0 wt. %; and residual TPP content=1.7 wt. %.

Samples A-J were analyzed by HPLC for the residual TPP content in wt. %, based on the total weight of the sample. The alkyl phenol formaldehyde resins were also analyzed by NMR spectroscopy in order to determine the composition of the resins (mole percent). The residual TPP content could also be determined by NMR spectroscopy and this was compared to the residual TPP content determined by HPLC. The testing results of Samples A-J are shown in Table 1.

TABLE 1

| | | | Residual TPP Content (wt. %) by | 1H NMR Analysis (Mole Fraction) | | | | | Residual TPP Content (wt. %) by |
|---|---|---|---|---|---|---|---|---|---|
| Example | Sample | PF/TPP CMR | HPLC | X = 1 | X = 2 | X = 3 | X = 4 | X = 5+ | NMR |
| 1 | A | — | 8.1 | — | — | — | — | — | — |
|   | B | — | 7.2 | — | — | — | — | — | — |
|   | C | — | 6.5 | — | — | — | — | — | — |
| 2 | D | 0.5 | 23.9 | 0.55 | 0.25 | 0.11 | 0.05 | 0.03 | 30 |
|   | E | 1.0 | 0.2 | 0.25 | 0.19 | 0.14 | 0.11 | 0.3 | 6 |
| 3 | F | 0.25 | 51 | 0.75 | 0.19 | 0.05 | 0.01 | — | 56 |
|   | G | 0.32 | 35.9 | 0.62 | 0.24 | 0.09 | 0.03 | 0.02 | 38 |
|   | H | 0.40 | 20.4 | 0.49 | 0.25 | 0.13 | 0.06 | 0.03 | 23 |
| 4 | I | 0.24 | 4.4 | — | — | — | — | — | — |
| 5 | J | 0.24 | 1.7 | — | — | — | — | — | — |

Example 6

Preparation of Overbased Sulfurized Alkyl Phenol Formaldehyde Phenates Using a Mixture of Alkyl Phenols A 4-liter reactor was charged with 611 g (2.33 gram moles) of tetrapropenyl phenol (available from Chevron Oronite Company LLC, San Ramon, Calif.), 108 g (0.29 gram moles) of a $C_{20-28}$ alkyl phenol made from the alkylation of phenol with a blend of $C_{20-24}$ and $C_{26-28}$ alpha olefins (available from Chevron Oronite Company LLC, San Ramon, Calif.), 575 g of 100 neutral oil (Exxon 100N, available from ExxonMobil Corporation) and 21.5 g (0.73 gram moles) of paraformaldehyde. The reaction mixture was heated to 110° C. Over a 15-minute period, 45.3 g (0.10 mol) of a $C_{20}$-$C_{24}$ alkylbenzene sulfonic acid derived from $C_{20}$-$C_{24}$ olefins was added.

After that, 406 g of isodecanol, 338 g (4.57 mol) of calcium hydroxide and 113 g (3.53 mol) of sulfur powder were added to the reaction mixture. The reaction mixture was then heated to 150° C. over a period of 30 minutes. The reaction mixture was charged with 206 g of ethylene glycol over another period of 30 minutes. The reaction mixture was then heated to 177° C. over a period of 60 minutes before 101.3 g (2.30 mol) of carbon dioxide was sparged into the reaction mixture over a period of 180 minutes. The reaction mixture was heated to 224° C. under vacuum to remove solvents and was filtered using diatomaceous clay to provide Sample 6. Sample 6 is characterized by the following analytical data: TBN=265.2 mg KOH/g; Viscosity=346.5 cSt (at 100° C.); Sulfur content=3.60 wt. %; Ca content=9.88 wt. %; and residual TPP content=3.2 wt. %. See Table 2.

TABLE 2

| Example | TPP, wt % | TBN, mg KOH/g | Vis @100 C., cSt | S, wt % | Ca, wt % |
| --- | --- | --- | --- | --- | --- |
| 6 | 3.2 | 265.2 | 346.5 | 3.60 | 9.88 |
| 7 | 2.3 | 281.9 | 376.5 | 3.26 | 9.76 |
| 8 | 2.1 | 279.9 | 224.6 | 2.97 | 9.92 |
| 9 | 2.6 | 286.4 | 231.9 | 3.62 | 9.78 |
| 10 | 3.5 | 279.5 | 302.7 | 3.50 | 9.97 |
| 11 | 1.9 | 262.2 | 244.6 | 3.39 | 9.79 |
| 12 | 2.5 | 279.3 | 333.9 | 3.43 | 10.13 |
| 13 | 2.8 | 277.8 | 199.3 | 3.42 | 9.89 |

Examples 7-13 were carried out exactly as in procedure in Example 6 except the CMRs of the tetrapropenyl phenol, the $C_{20-28}$ alkyl phenol made from the alkylation of phenol with a blend of $C_{20-24}$ and $C_{26-28}$ alpha olefins, the sulfur, and the paraformaldehyde was varied. This is summarized in Table 3. The chemical and physical properties of the products synthesized in Examples 7-13 is summarized in Table 2.

TABLE 3

| Example | Tetrapropenyl phenol grams | $C_{20-28}$ alkyl phenol grams | Sulfur grams | Paraformaldehyde grams |
| --- | --- | --- | --- | --- |
| 6 | 108 | 611 | 113 | 21.5 |
| 7 | 108 | 611 | 113 | 27.4 |
| 8 | 180 | 539 | 96 | 27.4 |
| 9 | 180 | 539 | 113 | 21.5 |
| 10 | 108 | 611 | 96 | 21.5 |
| 11 | 180 | 539 | 113 | 27.4 |
| 12 | 108 | 611 | 96 | 27.4 |
| 13 | 180 | 539 | 96 | 21.5 |

Results show that when tetrapropenyl phenol was reacted with sulfur and calcium hydroxide only, the product contained 6.5 wt. % to 8.1 wt. % of residual TPP, based on the total weight of the product. When tetrapropenyl phenol was reacted with formaldehyde first, and then with sulfur and calcium hydroxide simultaneously, the product contained 1.7 wt. % to 4.4 wt. % of residual TPP, based on the total weight of the product.

While the invention has been described with respect to a limited number of embodiments, the specific features of one embodiment should not be attributed to other embodiments of the invention. No single embodiment is representative of all aspects of the invention. In some embodiments, the methods may include numerous steps not mentioned herein. In other embodiments, the methods do not include, or are substantially free of, steps not enumerated herein. Variations and modifications from the described embodiments exist. The appended claims intend to cover all such variations and modifications as falling within the scope of the invention.

All publications and patent applications mentioned in this specification are herein incorporated by reference to the same extent as if each individual publication or patent application was specifically and individually indicated to be incorporated by reference. Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. A method of making a sulfurized metal alkyl phenate composition comprising the steps of:
    (a) reacting a phenol compound of Formula (I):

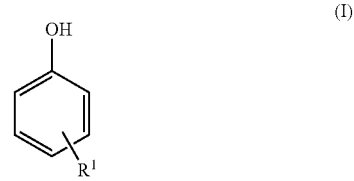

wherein $R^1$ is alkyl, alkylaryl, or arylalkyl, in the presence of a catalyst with an aldehyde having formula $R^2$—CHO to form a phenolic resin of Formula (II):

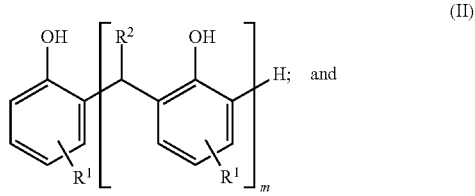

(b) reacting the phenolic resin wherein m is an integer from 1 to 50; $R^1$ is as defined above; and $R^2$ is H, alkyl, alkenyl, alkynyl, cycloalkyl, aryl, alkylaryl or arylalkyl simultaneously with at least one alkaline earth metal base and a first sulfurizing agent to form a sulfurized alkaline earth metal alkyl phenate.

2. The method of claim 1, wherein $R^1$ is alkyl.

3. The method of claim 2, wherein $R^1$ is a dodecyl group at the 4-position of the phenolic ring.

4. The method of claim 3, wherein $R^2$ is H.

5. The method of claim 1, wherein the at least one metal base is calcium hydroxide or calcium oxide.

6. The method of claim 1, wherein the first sulfurizing agent is sulfur.

7. The method of claim 1, wherein the catalyst is an acid.

8. The method of claim 1, wherein the sulfurized metal alkyl phenate composition comprises at least one of Formulae (IV) and (VI):

(IV)

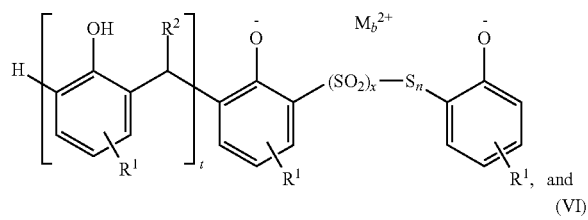

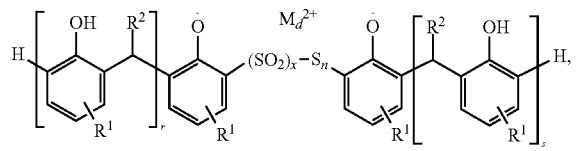

wherein each of $M_b^{2+}$ and $M_d^{2+}$ is independently a divalent metal ion; each of n, r, s and t is independently an integer from 1 to 50; x is an integer from 1 to 2; $R^1$ is alkyl, alkylaryl, or arylalkyl; and $R^2$ is H, alkyl, alkenyl, alkynyl, cycloalkyl, aryl, alkylaryl or arylalkyl.

9. The method of claim 8, wherein n is 1.

10. The method of claim 9, wherein the sulfurized metal alkyl phenate composition comprises at least one of Formulae (IV) and (VI) where each of $M_b^{2+}$ and $M_d^{2+}$ is independently an alkaline earth metal ion.

11. The method of claim 10, wherein the alkaline earth metal ion is calcium ion.

12. The method of claim 11, wherein $R^1$ is a $C_{12}H_{25}$ alkyl group at the 4-position of the phenolic ring; and $R^2$ is H.

13. The method of claim 12, wherein each of r, s and t is 1.

14. The method of claim 1, wherein the sulfurized metal alkyl phenate composition comprises the unreacted phenol compound of Formula (I), a metal salt thereof or a combination thereof and wherein the total amount of the unreacted phenol compound and the metal salt thereof is less than about 5 wt. %, based on the total weight of the sulfurized metal alkyl phenate composition.

15. The method of claim 1 further comprising reacting the sulfurized metal alkyl phenate composition with a second sulfurizing agent to lower the total amount of the unreacted phenol compound of Formula (I) and a metal salt thereof to less than about 2.0 wt. %, based on the total weight of the sulfurized metal alkyl phenate composition.

16. The method of claim 15, wherein the second sulfurizing agent is sulfur.

17. The method of claim 1 further comprising contacting the sulfurized metal alkyl phenate composition with carbon dioxide.

18. A sulfurized metal alkyl phenate composition comprising at least one of Formulae (IV) and (VI):

(IV)

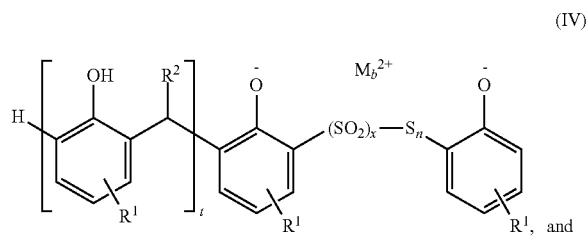

(VI)

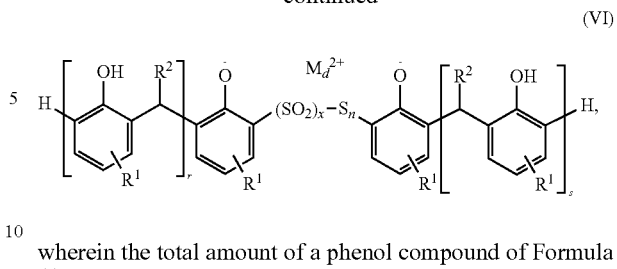

wherein the total amount of a phenol compound of Formula (I):

(I)

and a metal salt thereof in the sulfurized metal alkyl phenate composition is less than about 2.0 wt. %, based on the total weight of the sulfurized metal alkyl phenate composition, and wherein each of $M_b^{2+}$ and $M_d^{2+}$ is independently a divalent metal ion; each of n, r, s and t is independently an integer from 1 to 50; x is an integer from 1 to 2; $R^1$ is alkyl, alkylaryl, or arylalkyl; and $R^2$ is H, alkyl, alkenyl, alkynyl, cycloalkyl, aryl, alkylaryl or arylalkyl.

19. The sulfurized metal alkyl phenate composition of claim 18 comprising at least one of Formulae (IV) and (VI), wherein each of $M_b^{2+}$ and $M_d^{2+}$ is independently an alkaline earth metal ion.

20. The sulfurized metal alkyl phenate composition of claim 19, wherein the alkaline earth metal ion is calcium.

21. The sulfurized metal alkyl phenate composition of claim 20, wherein $R^1$ is a $C_{12}H_{25}$ alkyl group at the 4-position of the phenolic ring; and $R^2$ is H.

22. The sulfurized metal alkyl phenate composition of claim 21, wherein each of n, r, s and t is 1.

23. A sulfurized metal alkyl phenate composition prepared by a method comprising the steps of:
(a) reacting a phenol compound of Formula (I):

(I)

wherein $R^1$ is alkyl, alkylaryl, or arylalkyl, in the presence of a catalyst with an aldehyde having formula $R^2$—CHO to form a phenolic resin of Formula (II):

(II)

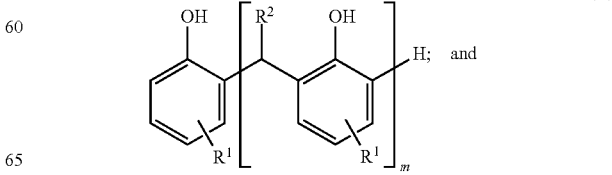

(b) reacting the phenolic resin wherein m is an integer from 1 to 50; $R^1$ is as defined above, and $R^2$ is H, alkyl, alkenyl, alkynyl, cycloalkyl, aryl, alkylaryl or arylalkyl simultaneously with at least one alkaline earth metal base and a first sulfurizing agent to form a sulfurized alkaline earth metal alkyl phenate.

24. The sulfurized metal alkyl phenate composition of claim 23 further comprising reacting the sulfurized metal alkyl phenate composition with a second sulfurizing agent to lower the total amount of the unreacted phenol compound and a metal salt thereof in the sulfurized metal alkyl phenate composition to less than about 2.0 wt. %, based on the total weight of the sulfurized metal alkyl phenate composition.

25. The sulfurized metal alkyl phenate composition of claim 24, wherein the second sulfurizing agent is sulfur.

26. The sulfurized metal alkyl phenate composition of claim 23, wherein the first sulfurizing agent is sulfur.

27. The sulfurized metal alkyl phenate composition of claim 23, wherein the at least one metal base is calcium hydroxide or calcium oxide.

28. The sulfurized metal alkyl phenate composition of claim 23, wherein the catalyst is an acid.

29. The sulfurized metal alkyl phenate composition of claim 23, wherein $R^1$ is alkyl.

30. The sulfurized metal alkyl phenate composition of claim 25, wherein $R^1$ is a dodecyl group at the 4-position of the phenolic ring.

31. The sulfurized metal alkyl phenate composition of claim 26, wherein $R^2$ is H.

32. A lubricating oil composition comprising a base oil of lubricating viscosity and a sulfurized metal alkyl phenate composition of claim 18.

33. A lubricating oil composition comprising a base oil of lubricating viscosity and a sulfurized metal alkyl phenate composition of claim 23.

34. The lubricating oil composition of claim 32 further comprising at least one additive selected from the group consisting of antioxidants, antiwear agents, detergents, rust inhibitors, demulsifiers, friction modifiers, multi-functional additives, viscosity index improvers, pour point depressants, foam inhibitors, metal deactivators, dispersants, corrosion inhibitors, lubricity improvers, thermal stability improvers, anti-haze additives, icing inhibitors, dyes, markers, static dissipaters, biocides and combinations thereof.

35. The method of claim 1, further comprising reacting the product of step b with carbon dioxide.

36. The method of claim 35, wherein the reaction with carbon dioxide takes place in the presence of ethylene glycol.

37. An overbased sulfurized metal alkyl phenate composition prepared by the method of claim 35.

38. An overbased sulfurized metal alkyl phenate composition prepared by the method of claim 36.

39. A lubricating oil composition comprising a major amount of a base oil of lubricating viscosity and the overbased sulfurized metal alkyl phenate composition of claim 37.

40. A lubricating oil composition comprising a major amount of a base oil of lubricating viscosity and the overbased sulfurized metal alkyl phenate composition of claim 38.

* * * * *